(12) United States Patent
Czerwinski et al.

(10) Patent No.: US 7,452,703 B1
(45) Date of Patent: Nov. 18, 2008

(54) URANIUM ENRICHMENT USING MICROORGANISMS

(75) Inventors: Kenneth R. Czerwinski, Henderson, NV (US); Martin F. Polz, Cambridge, MA (US)

(73) Assignee: Massachusetts Institute of Technology, Boston, MA (US)

( * ) Notice: Subject to any disclaimer, the term of this patent is extended or adjusted under 35 U.S.C. 154(b) by 885 days.

(21) Appl. No.: 10/802,637

(22) Filed: Mar. 17, 2004

Related U.S. Application Data (60) Provisional application No. 60/455,402, filed on Mar. 17, 2003.

(51) Int. Cl.
*C12P 3/00* (2006.01)
*C12P 41/00* (2006.01)

(52) U.S. Cl. .................................. 435/168; 435/280
(58) Field of Classification Search ................ 435/168, 435/280
See application file for complete search history.

(56) References Cited

U.S. PATENT DOCUMENTS

| | | |
|---|---|---|
| 6,787,042 B2 | 9/2004 | Bond et al. |
| 7,087,206 B2 | 8/2006 | Bond et al. |

FOREIGN PATENT DOCUMENTS

WO 2005018871 A2 3/2005

OTHER PUBLICATIONS

Caccavo et al., *Geovibrio ferrireducens*, "A phylogenetically distinct dissimilatory Fe(III)-reducing bacterium", Arch. Microbiol. 165: 370-376, 1996.
Caccavo et al., "*Geobacter sulfurreducens* sp. nov., a hydrogen- and acetate oxidizing dissimilatory metal-reducing microorganism", Appl. Environ. Microbiol., 60: 3752-3759, 1994.
Coates et al., "*Geobacter hydrogenophilus, Geobacter chapellei* and *Geobacter griciae*, three new, strictly anaerobic, dissimilatory Fe(III)-reducers", Int. J. Syst. Evol. Microbiol. 51: 581-588, 2001.
Coates et al., "Carbohydrate oxidation coupled to Fe(III) reduction, a novel form of anaerobic metabolism", Anaerobe, 4: 277-282, 1998.
Coates et al., "Isolation of *Geobacter* species from diverse sedimentary environments", Appl. Environ. Microbiol., 62: 1531-1536, 1996.
Francis et al., "XPS and XANES studies of uranium reduction by *Clostridium* sp.", Environ. Sci. Technol,. 28: 636-639, 1994.
Francis et al., "Dissimilatory metal reduction by the facultative anaerobe *Pantoea agglomerans*", Appl. Environ. Microbiol., 66: 543-548, 2000.
Fredrickson et al., "Reduction of Fe(III), Cr(VI), U(VI), and Tc(VII) by *Deinococcus radiodurans* R1", Appl. Environ. Microbiol., 66: 2006-2011, 2000.
Ganesh et al., "Reduction of hexavalent uranium from organic complexes by sulfate- and iron-reducing bacteria," Appl. Environ. Microbiol., 63: 4385-4391, 1997.
Gorby et al., "Enzymatic Uranium Precipitation", Environ. Sci. Technol.,26(1), 1992.
Heidelberg et al., "Genome sequence of the dissimilatory metal ion-reducing bacterium *Shewanella oneidensis*", Nat Biotechnol., 20(11):1118-23, 2002.
Kashefi et al., "Reduction of Fe(III), Mn(IV), and toxic metals at 100degreeC by *Pyrobaculum islandicum*", Appl. Environ. Microbiol., 66: 1050-1056, 2000.
Kuai et al., "A rapid and simple method for the MPN estimation of arsenic-reducing bacteria", Appl. Environ. Microbiol., 67(7):3168-73, 2001.
Lovley et al., "Microbial reduction of uranium", Nature, 350: 413-416, 1991.
Lovely et al., "Reduction of uranium by cytochrome c3 of *Desulfovibrio vulgaris*", Appl. Environ. Microbiol., 59: 3572-3576, 1993a.
Lovely et al., "*Geobacter metallireducens* gen. nov. sp. nov., a microorganism capable of coupling the complete oxidation of organic compounds to the reduction of iron and other metals," Arch. Microbiol., 159: 336-344, 1993b.
Lovely, "Microbial reduction of iron, manganese, and other metals," Advances in Agronomy, 54: 175-231, 1995.
Mellor et al., "Reduction of nitrate and nitrite in water by immobilized enzymes", Nature, 355: 717-719, 1992.
Niki et al., "Electrode reaction of cytochrome c3 of *Desulfovibrio vulgaris*, Miyazaki." J. Electrochem. Soc., 124:1889-1892, 1977.
Payne et al., "Uranium Reduction by *Desulfovibrio desulfuricans* Strain G20 and a Cytochrome c3 Mutant", Appl. Env. Microbiol., 68(6): 3129-3132, 2002.
Roden et al., "Dissimilatory Fe(III) reduction by the marine microorganism *Desulfuromonas acetoxidans*", Appl. Environ. Microbiol., 59: 734-742, 1993.
Suzuki et al, "Nanometre-size products of uranium bioreduction" Nature, 419(6903):134, 2002.
Taylor et al., "Plutonium isotope ratio analysis at femtogram levels by multicollector ICP-MS.", J. Anal. Atom. Spectr., 16: 279-284, 2002.
Tebo et al., "Sulfate-reducing bacterium grows with Cr(VI), U(VI), Mn(IV), and Fe(III) as electron acceptors", FEMS Microbiol. Let., 162: 193-198, 1998.
Wade et al., "Isolation of U(VI) reduction-deficient mutants of *Shewanella putrefaciens*", FEMS Microbiol Lett., 184 (2):143-8, 2000.
International Search Report on PCT-US2004-08213, mailed on Jun. 18, 2008.
Written Opinion by the ISA on PCT-US2004-08213, mailed on Jun. 18, 2008.

*Primary Examiner*—Herbert J. Lilling
(74) *Attorney, Agent, or Firm*—Choate, Hall & Stewart, LLP (57) ABSTRACT

The present invention provides methods for separating isotopes of actinide elements such as uranium using microorganisms, e.g., metal or sulfate reducing bacteria. The microorganisms reduce the actinide element to form a precipitate, which contains a greater proportion of the lighter isotope relative to the heavier isotope than the starting material. The precipitate may be collected, re-oxidized, and subjected to multiple rounds of enrichment. Alternately, separation processes not requiring formation of a precipitate may be used. The invention also features cell-free systems for isotope separation. The invention further provides compositions produced according to the foregoing methods, including compositions comprising enriched uraninite.

85 Claims, 3 Drawing Sheets

URANIUM ENRICHMENT USING MICROORGANISMS

CROSS-REFERENCE TO RELATED APPLICATION

This application claims priority to U.S. Provisional Patent Application 60/455,402, filed Mar. 17, 2003, which is herein incorporated by reference.

BACKGROUND OF THE INVENTION

The United States and most other developed countries currently rely heavily on oil, coal, and natural gas for their energy needs. As supplies of these fossil fuels diminish, and as concerns regarding pollution and global warming increase, there is a growing need for alternate sources of energy. Nuclear power generation offers an alternative to the burning of fossil fuels to produce electricity.

The U.S. nuclear power industry presently supplies approximately 20% of the nation's electricity. The industry achieved its third straight year of record power generation levels during the year 2000, which represents continued growth in power production for technology that had been used to produce only 577.0 billion kilowatt-hours as recently as 1990. (See the Web site having URL www.eia.doe.gov/neic/infosheets/nuclear.htm for further information.) As of the year 2000, there were 66 nuclear power plants (composed of 104 licensed nuclear reactors) in the U.S. Other nations that use nuclear power to supply a significant portion of their electricity needs include France (57 reactors), Japan (53 reactors), the United Kingdom (33 reactors), and Russia (30 reactors). Thus nuclear power generation plays an important role in supplying electricity in the U.S. and throughout the world.

In general, a nuclear power plant operates in a similar fashion to a fossil fuel plant, with one major difference: the source of heat. The production of energy in a nuclear power plant is achieved by the fissioning or splitting of uranium atoms, which releases energy in the form of heat. Uranium found in nature consists largely of two isotopes, U-238 and the much less abundant U-235, which constitutes only approximately 0.7% of naturally occurring uranium. Most of the commercial nuclear power reactors operating or under construction in the world today require uranium enriched in the U-235 isotope.

U-235 and U-238 are chemically identical, but differ in their physical properties, in particular their mass. This mass difference makes it possible to separate the isotopes and thus to increase, or enrich, the percentage of U-235 in a given sample of material. Most reactors use enriched uranium in which the proportion of U-235 has been increased to approximately 3-4%. Although a variety of enrichment processes have been demonstrated on a laboratory or prototype scale, only two, the gaseous diffusion process and the centrifuge process, are operating on a commercial basis. Both of these processes require the conversion of uranium (which typically leaves the mine as a stable oxide known as $U_3O_8$), into uranium hexafluoride ($UF_6$). The gaseous diffusion process involves forcing $UF_6$ gas at high pressure through a series of porous membranes, which results in a separation of molecules containing the lighter U-235 atoms from molecules containing the heavier U-238. In the centrifuge process $UF_6$ gas is spun at high speed in a cylinder(s) under vacuum. Heavier molecules containing U-238 increase in concentration towards the cylinder's outer edge while lighter molecules increase in concentration towards the center.

The enrichment processes described above suffer from a number of drawbacks. $UF_6$ is a hazardous compound, which reacts with water to form the highly corrosive hydrogen fluoride (HF). The production of $UF_6$ is further encumbered due to the required use of HF or $F_2$. If released into the atmosphere, gaseous $UF_6$ combines with humidity to form a cloud of particulate $UO_2F_2$ and HF fumes. In order to transport $UF_6$ it is typically converted into the solid form, which requires a low pressure. Rapid expansion, with the potential for rupture, can take place if there are rapid increases in temperature or pressure.

Enrichment processes can also consume a significant amount of energy and generate deple $UF_6$ as a waste product. Most depleted $UF_6$ produced so far is stored in steel cylinders in yards near the enrichment plants, where they are subject to corrosion. The integrity of the cylinders must therefore be monitored and maintained, which requires handling. The painting must be refreshed from time to time. This maintenance work requires moving of the cylinders, causing further hazards from breaching of corroded cylinders, and from handling errors. In addition, equipment such as high-speed centrifuges needed for enrichment processes is expensive and must be constructed to meet exacting specifications. As a consequence of the many disadvantages of currently available enrichment technologies, there is a need for new methods or uranium enrichment. In addition, there is a need for improved methods of separating isotopes for purposes of treating enriched uranium stocks and for the purification of uranium (and other radioactive compounds) from waste mixtures.

SUMMARY OF THE INVENTION

The present invention provides a variety of methods for using microorganisms and/or proteins derived from microorganisms to separate isotopes of actinide elements such as uranium, resulting in enrichment for the lighter isotope ($^{235}U$). According to one aspect, the invention provides a method for separating isotopes of an actinide element comprising steps of: (i) providing a composition comprising molecules comprising an actinide element, wherein at least some of the molecules include a first isotope of the actinide element and at least some of the molecules include a second isotope of the actinide element; (ii) exposing the molecules comprising the actinide element to reducing activity of actinide element reducing microorganisms, thereby allowing formation of a precipitate comprising the actinide element, wherein the precipitate contains a higher proportion of the second isotope relative to the first isotope than was present in the original composition, thereby effecting a separation of the first and second isotopes; and (iii) effecting an increased separation of the first and second isotopes present in the precipitate using any suitable process. According to certain preferred embodiments of the invention the actinide element is uranium.

According to certain embodiments of the invention the exposing step comprises (i) combining the composition and the microorganisms in a vessel together with culture medium, thereby producing a culture; and (ii) maintaining the culture for a time sufficient to allow formation of a precipitate. The method may further comprise the step of separating the precipitate from unprecipitated molecules containing the actinide element, which may be accomplished by collecting the precipitate. According to certain preferred embodiments of the invention the effecting step comprises (i) oxidizing at least some of the molecules comprising the actinide element in the precipitate to form a second composition; and (ii) repeating the exposing step with the second composition, thereby effecting an increased separation of the first and second isotopes. The method may be performed in either batch or continuous mode, and the steps may be repeated until a desired degree of isotope separation is achieved.

According to certain embodiments of the invention the microorganisms are metal or sulfate reducing bacteria. They may be anaerobes or facultative anaerobes, although the latter are preferred in certain embodiments of the invention since they can be pre-grown under aerobic conditions to achieve a high biomass. The microorganisms may, for example, be members of a bacterial genus selected from the group consisting of: *Clostridium, Shewanella, Geobacter, Pyrobaculum, Desulfotomaculum,* and *Desulfovibrio*.

In another aspect, the invention provides a method for separating isotopes of an actinide element comprising steps of: (i) providing a composition comprising molecules comprising an actinide element, wherein at least some of the molecules include a first isotope of the actinide element and at least some of the molecules include a second isotope of the actinide element; (ii) incubating the molecules comprising the actinide element with an actinide reducing enzyme obtained from an actinide element reducing microorganism, thereby allowing formation of a precipitate comprising the actinide element, wherein the precipitate contains a higher proportion of the second isotope relative to the first isotope than was present in the original composition, thereby effecting a separation of the first and second isotopes; and (iii) effecting an increased separation of the first and second isotopes present in the precipitate using any suitable process. According to certain embodiments of the invention the actinide reducing enzyme is a cytochrome c enzyme.

In another aspect, the invention provides a method of separating isotopes of an actinide element comprising steps of: (i) providing a composition comprising molecules comprising an actinide element, wherein at least some of the molecules include a first isotope of the actinide element and at least some of the molecules include a second isotope of the actinide element; (ii) incubating the molecules comprising the actinide element with an actinide reducing enzyme obtained from an actinide element reducing microorganism, thereby allowing reduction of the actinide element to form a reduced actinide element; (iii) removing the reduced actinide element; (iv) further incubating the reduced actinide element, thereby allowing formation of a precipitate comprising the reduced actinide element, wherein the precipitate contains a higher proportion of the second isotope relative to the first isotope than was present in the original composition, thereby effecting a separation of the first and second isotopes; and (v) effecting an increased separation of the first and second isotopes present in the precipitate using any suitable process.

This application refers to and lists various patents, patent applications, journal articles, books, and other references. All of these are incorporated herein by reference.

DETAILED DESCRIPTION OF CERTAIN EMBODIMENTS OF THE INVENTION

Overview. The present invention represents a new technology for separating isotopes of actinide elements such as uranium. In contrast to the various separation systems described above, the technology described here is based on the metabolic activity of certain microorganisms. Separation of isotopes can result in material that contains an increased percentage of a particular isotope relative to the percentage of that isotope present in the material prior to separation. The terms "separation" and "fractionation" in reference to isotopes are used interchangeably herein. The process of increasing the percentage of an isotope is referred to as enrichment, and a material that contains a higher percentage of a particular isotope than naturally found in nature is referred to as being enriched in that isotope. The metabolic activity of certain metal-reducing and/or sulfate-reducing bacteria, such as *Shewanella oneidensis*, reduces uranium (VI) to uranium (IV) under anaerobic conditions (Lovley et al., *Nature,* 1991. Note that *S. oneidensis* was previously named *Alteromonas putrefaciens* and then *S. putrefaciens*.). This results in separation of reduced uranium from the oxide starting material since uraninite ($UO_2$), the end product of the metabolic process, is an insoluble precipitate while unaltered oxide uranyl-ions ($UO_2^{2+}$) can remain in solution. The precipitate is mostly or entirely extracellular. The inventors have discovered that this precipitation leads to significant and reproducible fractionation of isotopes between the soluble and the solid phases of uranium and thus results in a uraninite precipitate that is enriched in the lighter isotope relative to the starting material. Repeating the process results in further enrichment of the uraninite precipitate. Alternately, according to certain embodiments of the inventive methods reduced uranium is removed from the starting material by without formation of a precipitate (e.g., by extraction).

While not wishing to be bound by any theory, it is believed that fractionation of isotopes is due to the preferential utilization of the lighter isotope by microbial proteins involved in the reduction process. The finding that such proteins discriminate between and preferentially utilize $^{235}U$ was unexpected since $^{235}U$ differs by only 3 atomic mass units from $^{238}U$, a difference of less than $[(3/238) \times 100]=0.0126$, i.e., less than 1.3% of the mass of the more abundant isotope. This is particularly the case given the much greater mass of uranium than of other elements in which biological isotope fractionation has been shown to occur. (See, e.g., Lovley 1995).

As described in more detail in Examples 1 and 2, isotopic separation by bacteria was confirmed using two high precision analytical methods, primarily flash evaporation thermal ionization mass spectrometry (TIMS) with confirmation by inductively coupled plasma (ICP) magnetic sector multiple collector mass spectrometry as an independent technology.

The results are further supported by mass balance of uranium between the solid and soluble phase using determination of total uranium by ICP-Atomic Emission Spectrometry. A separation factor for $^{235}U$ and $^{238}U$ greater than 1.06 was achieved, suggesting that optimization will result in a process capable of achieving separation factors greater than those attained using the gas centrifuge method. Even without optimization, the separation factor is considerably greater than that associated with the gas diffusion process. A third experiment (Example 3) conducted under still more stringent conditions to avoid even minute sources of contamination of the experimental samples with natural or depleted uranium confirmed the results reported in Examples 1 and 2.

The invention therefore provides a method for separating isotopes of an actinide element comprising steps of: (i) providing a composition comprising molecules comprising an actinide element, wherein at least some of the molecules include a first isotope of the actinide element and at least some of the molecules include a second isotope of the actinide element; (ii) exposing the molecules comprising the actinide element to reducing activity of actinide element reducing microorganisms, thereby allowing formation of a precipitate comprising the actinide element, wherein the precipitate contains a higher proportion of the second isotope relative to the first isotope than was present in the original composition, thereby effecting a separation of the first and second isotopes; and (iii) effecting an increased separation of the first and second isotopes present in the precipitate using any suitable process. According to preferred embodiments of the invention the step of effecting an increased separation of the first and second isotopes present in the precipitate is performed by oxidizing at least some of the molecules comprising the actinide element in the precipitate to form a second composition and repeating the exposing step with the second composition, thereby effecting an increased separation of the first and second isotopes. However, the material resulting from the method may be further enriched using any conventional enrichment technique, e.g., gas centrifugation, gaseous diffusion, monothermal chemical exchange, distillation, laser enrichment (e.g., atomic vapour laser isotope separation). Note that the step of effecting an increased separation of the first and second isotopes present in the precipitate does not require that the isotopes remain in the form of a precipitate during the process. Rather the wording is intended to convey that it is the material in the precipitate, which is already enriched to a degree following the exposing step, that is to be further enriched by subsequent processing.

While the invention will generally be described with reference to uranium, the similar chemistry of other actinide elements, e.g., the transuranic elements plutonium and neptunium, strongly suggests that this technology will achieve comparable results for these elements. Plutonium has oxidation states of $3^+$, $4^+$, $5^+$, and $6^+$, of which Pu $4^+$ is the most likely under normal conditions. The invention accordingly provides a biological enrichment technique as described for uranium, wherein plutonium is reduced from the $6^+$ state to the $4^+$ state, which is accompanied by a solution to solid transformation, or wherein plutonium is reduced from the $4^+$ state to the $3^+$ state, which is accompanied by a solid to solution transformation or solution to solution transformation if the $4^+$ state is held in solution by complexation with a ligand. The reduction will result in an enrichment of the lower oxidation state. For Pu the isotopes 236, 238-242, and 244 have half lives that are suitable for bacterial enrichment. Neptunium has oxidation states of Np $5^+$ and Np $4^+$, of which Np $5^+$ is the main oxidation state. The invention further provides a biological enrichment technique as described for uranium, wherein neptunium is reduced from the Np $5^+$ state to the Np $4^+$ state, where the lighter isotope is enriched in the reduced state. For Np the isotopes 235, 236, and 237 can be used.

Selection of Microorganisms. By "actinide element reducing microorganisms" is meant any of the wide variety of microorganisms capable of reducing actinide elements such as uranium. Uranium reduction is carried out by a diversity of microorganisms, e.g., various bacteria capable of reduction of different metals such as Fe(III), Mn(IV), Cr(VI) and/or sulfate ($SO_4^{2-}$). In general, under anaerobic conditions, metabolic reduction of uranium oxides [U(VI)] to [U(IV)] by metal and/or sulfate reducing bacteria is coupled to oxidation of an electron donor such as molecular hydrogen or a variety of carbon substrates, including, but not limited to, lactate or acetate. Representative examples of bacteria that may be used in various embodiments of the invention, are listed in Table 1. Thus in certain embodiment of the invention the microorganisms are members of a bacterial genus selected from the group consisting of: *Clostridium*, *Shewanella*, *Geobacter*, *Pyrobaculum*, *Desulfotomaculum*, and *Desulfovibrio*. However, the invention is not limited to these genera or strains. In fact, with few exceptions (Table 2), uranium reduction has been reported in most metal- and/or sulfate-reducing bacteria examined to date. Such bacteria are commonly isolated from a variety of environments including, for example, sediments and sludges, and it is likely that numerous additional species capable of reducing uranium and useful in the practice of the present invention remain to be discovered.

Either anaerobes or facultative aerobes may be used. However, according to certain preferred embodiments of the invention facultative aerobes are used, allowing the microorganisms to be cultured under aerobic conditions to achieve a high cell density and number as described further below, before switching to anaerobic conditions to allow reduction of the uranium. *Shewanella oneidensis* is a particularly convenient microorganism for purposes of uranium reduction and isotope fractionation because it is a facultative aerobic organism that can be easily grown in large quantities. Furthermore, it serves as a model organism in molecular genetic studies, making it a likely candidate for isolation and production of enzymes responsible for uranium reduction and fractionation. The complete genome sequence of this microorganism has been determined (Heidelberg, 2002), which will facilitate identification of genes whose protein products are involved in reduction.

TABLE 1

Bacterial strains for which uranium reduction has been demonstrated in addition to *S. oneidensis*.

| Bacterial Strain | Reference |
| --- | --- |
| *Clostridium* sp. | (Francis et al., 1994) |
| *Deinococcus radiodurans* R1 | (Fredrickson et al., 2000) |
| *Geobacter chapelleii* | (Coates et al., 2001; Coates et al., 1996) |
| *Geobacter hydrogenophilus* H2 | (Coates et al., 1996) |
| *Geobacter metallireducens* | (Lovley et al., 1991) |
| *Geobacter* H4 | (Coates et al., 1996) |
| *Geobacter* TACP-2 | (Coates et al., 1996) |
| *Geobacter* TACP-3 | (Coates et al., 1996) |
| *Pyrobaculum islandicum* | (Kashefi and Lovley, 2000) |
| *Shewanella alga* | (Ganesh et al., 1997) |
| *Shewanella saccharophila* | (Coates et al., 1998) |
| *Desulfotomaculum reducens* MI-1 | (Tebo and Obraztsova, 1998) |
| *Desulfosporosinus* spp. | (Suzuki, et al., 2002) |
| *Desulfovibrio desulfuricans* | (Ganesh et al., 1997) |
| *Desulfovibrio vulgaris* | (Lovley et al., 1993) |

TABLE 2

Bacterial strains tested for uranium reduction with negative results.

| Bacterial Strain | Reference |
| --- | --- |
| *Desulfuromonas acetoxidans* | (Roden and Lovley, 1993) |
| *Geobacter sulfurreducens* | (Caccavo et al., 1994) |
| *Geovibrio ferrireducens* PAL-1 | (Caccavo et al., 1996) |
| *Pantoea agglomerans* | (Francis et al., 2000) |

Selection of Medium. In general any medium suitable for anaerobic maintenance of the bacteria can be used. See, e.g., Garrity, G., (ed.), *Bergey's Manual of Systematic Bacteriology*, 2$^{nd}$ Ed., Springer Verlag, 2001) for media and culture procedures, Atlas, R., *Handbook of Media for Environmental Microbiology*, CRC Press, Boca Raton, 1995, for media; Levett, P. (ed), *Anaerobic microbiology: a practical approach*, IRL Press, Oxford University Press, 1991 for anaerobic techniques. Preferably the medium does not contain significant quantities of components that would lead to precipitation of substances that may interfere with the collection of enriched uraninite. Thus preferably the exposing step takes place in a medium substantially free of counterions capable of forming insoluble salts with unreduced uranyl. According to certain embodiments of the invention the concentration of any counterion capable of forming an insoluble salt with unreduced uranyl is less than 10% of the concentration of unreduced molecules of the actinide element in the medium. According to certain embodiments of the invention the concentration of any counterion capable of forming an insoluble salt with unreduced uranyl is less than 5% of the concentration of unreduced molecules of the actinide element in the medium. According to certain embodiments of the invention the concentration of any counterion capable of forming an insoluble salt with unreduced uranyl is less than 1% of the concentration of unreduced molecules of the actinide element in the medium. In particular, according to preferred embodiments of the invention the medium lacks significant quantities of phosphates ($PO_4^{2-}$) in order to prevent co-precipitation of uranyl-phosphate with the metabolically reduced uraninite. For example, preferably the phosphate concentration is below approximately 0.002 M, more preferably below approximately 0.001 M, and more preferably below approximately 0.0005 M. If phosphate is added to the medium, it is generally preferred that it be added as the last step of media preparation, e.g., following addition of the uranyl-containing compound.

Examples 1 and 2 describe use of a standard anaerobic medium containing lactate as the electron donor and soluble uranyl-acetate as the uranium salt. However, any bacteriological medium that is sufficiently stable in the circumneutral pH range under anaerobic conditions can be substituted for the medium described. Generally such a pH will range from approximately 5.5 to 8.5. However, certain microorganisms, including acidophilic iron reducers (e.g, *Pyrobaculum*), normally live at a much lower pH, e.g., as low as approximately 1.0. Thus the methods of the invention may be practiced at these low pH values. One of ordinary skill in the art will be able to select appropriate culture media. It is noted that at these low pH values the solubility of $UO_2$ changes. This may have an effect on the $UO_2$ yield but is not expected to greatly change the values. Operating the process under these conditions may require an increased number of iterations to achieve a desired degree of isotope separation. Certain microorganisms (e.g., *Pyrobaculum*) may normally live at elevated temperatures, e.g., close to 100° C.

Addition of nutrients, vitamins, and trace elements to the medium is generally optional since the bacteria may be maintained under non-growth conditions, e.g., due to the lack of phosphate in the medium. Uranium reduction and isotope fractionation do not require that the bacteria be maintained under growth conditions.

Selection of Uranium Species. In general, it is preferable to provide uranium in a soluble form, e.g., in the form of a uranyl ($UO_2^{2+}$) containing compound. Uranium may also be provided in a solid form, e.g., as $U_3O_8$, in which case the process would entail an oxidized solid being transformed into a reduced solid ($UO_2$). Since $U_3O_8$ is more soluble that $UO_2$, it is still possible to separate the reduced from the oxidized species. Preferably the counter anion to the uranyl is not an electron accepting species that can compete with U for reduction. As an example, nitrate salts of uranyl are easily obtained but in certain cases will not produce the desired reduction of $UO_2^{2+}$ to $UO_2$ since the bacteria will preferentially reduce the nitrate. For example, since *Shewanella* are able to reduce nitrate, it is preferable to avoid using nitrate salts when they are employed. However, for other bacteria such as *Geobacter*, which are thought not to be able to reduce nitrate, nitrate salts of uranyl may be used.

The oxidized uranium is preferably introduced with a counter anion that can be metabolized by the bacteria (e.g., lactate or acetate) or with a counter anion that will not be reduced (e.g., chloride). Preferably the counter anion is one that forms a readily soluble salt with uranyl rather than forming a solid and does not significantly increase the solubility of the $UO_2$ solid. As will be appreciated by one of ordinary skill in the art, in order to carry out reduction, the bacteria require a source of electrons (an electron donor). In general, this source can be any oxidizable substrate, from which the electrons are fed into an electron transport chain leading to uranyl as the terminal electron acceptor. In the live bacterium electrons can come from carbon or hydrogen (if the bacteria possess hydrogenase). In general, any carbon substrate that the bacteria are capable of using may be employed. The range of carbon substrates compatible with use by any particular bacterial species will vary. For example, lactate is almost universally used by anaerobic bacteria, and acetate is also very commonly used. Citrate is used by some anaerobic bacteria but is toxic for others. Other possible choices, which may be suitable for some bacteria, include formate, pyruvate, malonate, and oxalate. One of ordinary skill in the art will be able to select an appropriate electron donor taking into consideration the bacterium employed. Different electron donors may be tested to optimize the reduction process.

Suitable uranium salts can be prepared, for example, by first dissolving the starting material (e.g., uranyl nitrate or $U_3O_8$) either in water or acid. The solution pH is then adjusted to neutral or basic, forming a precipitate such as uranyl hydroxide. The uranyl precipitate is then washed with water to remove any undesirable counter anions. The precipitate is dissolved in an appropriate solution containing the desired counter ion (e.g., hydrochloric acid or acetic acid). The salt can be made from the solution or the solution can be prepared and used as the vehicle by which to introduce the uranium into the vessel or other setting in which reduction is to take place.

Cell Density, Scale of Operation, Bioprocess Operations and Optimization.

While not wishing to be bound by any theory, the studies described in Examples 1 and 2 indicate that reduction rate is dependent upon biomass, and rapid reduction can be achieved at high biomass levels. Generation of large amounts of biomass can be efficiently achieved by utilization of facultative aerobic bacteria, such as *S. oneidensis*. According to certain embodiments of the invention facultatively aerobic bacteria are pregrown under aerobic conditions using, for example, standard bacteriological media and growth vessels, in order to achieve a high cell density and cell number. Bacteria may be concentrated, e.g., by centrifugation, prior to inoculation into the medium in which reduction is to take place. Following an aerobic growth phase, cells are then inoculated into the medium in which reduction is to occur under anaerobic conditions. Alternatively, cells may be grown entirely under anaerobic conditions, in which case either facultative aerobes or anaerobes may be used.

According to certain embodiments of the invention the cell density in the medium in which reduction to occur is at least approximately $10^7$ to $10^9$ cells per mL to allow for efficient and rapid reduction. However, either lower or higher cell densities (e.g., up to approximately $10^{10}$ cells/mL) may be employed. Higher cell densities may lead to undesirable clumping. One of ordinary skill in the art will be able to adjust the cell concentration to optimize kinetics of fractionation depending on the scale and mode of operation of the fractionation procedure.

According to certain embodiments of the invention the reduction and precipitation processes, and resulting fractionation, are carried out in batch mode in, for example, standard anaerobic fermenters (bioreactors). The fermenters can be any of a number of different culture vessels. Such vessels are commercially available in a wide range of sizes. Microorganisms may float freely in the medium or may be affixed to various solid supports such as beads or membranes. The necessary components for the process (medium, microorganisms, and uranium containing molecules) may be added in a number of different orders. For example, medium (with or without microorganisms) and uranium containing molecules may be introduced into the vessel in either order. Uranium can be added to the medium as a uranyl-containing salt. Alternately, a solution containing such a salt can be used as the vehicle by which to introduce the uranium into the vessel in which reduction is to occur.

According to certain embodiments of the invention a continuous flow method using immobilized cells could also be used for uranium reduction and precipitation. In these methods the cells may be fixed onto a solid support such as membranes or beads, or contained within semi-permeable membranes while the solution containing the oxidized $UO_2^{2+}$ traverses the immobilized cells. According to certain embodiments of the invention solid supports such as beads with attached cells may be packed within a column, and solution containing oxidized $UO_2^{2+}$ allowed to traverse the immobilized cells. The solution may be pumped through the column or may flow through due to gravity.

According to certain embodiments of the invention the microorganisms are introduced into a vessel, chamber, etc., in which they are separated from the uranyl-containing molecules by a semi-permeable membrane that does not permit passage of the microorganisms but allows diffusion of the molecules. Uranyl ions diffuse across the membrane into the portion of the chamber that contains the microorganisms, where they are reduced and precipitated as uraninite. According to certain embodiments of the invention a solution containing the uranyl-containing molecules is continuously flowed or circulated past the membrane.

According to certain embodiments of the invention a counter flow system is employed in which bacteria and uranyl-containing media are injected separately. This embodiment is based on counter flow systems used in separation processes and in counter flow cooling. In one embodiment, two columns are connected by a membrane, which allows uranyl diffusion. At the top of one column the uranyl solution is introduced while the solution containing bacteria is introduced at the bottom of the other column. The solutions in the columns flow in opposite directions. The uranyl concentration decreases from the top to the bottom. Once it passes through the column it can be recycled or introduced into another column. This embodiment differs from the semi-permeable membrane method described above in that both the uranyl and the solution containing bacteria flow.

One of ordinary skill in the art will be able to optimize the separation process by selection of an appropriate design from among those described above and other suitable processes known in the art of process engineering, as well as by selection of appropriate parameters. Methods for bioprocess optimization are described in the following standard reference works, which are incorporated herein by reference: Stephanopolous, G., ed. *Bioprocessing*. Second ed.; Biotechnology, ed. H.-J. Rehm, et al. Vol. 3. 1993, VCH Publishers Inc.: New York; Bailey, J. E. and D. F. Ollis, *Biochemical Engineering Fundamentals*. Second ed. McGraw-Hill chemical engineering series. 1986: McGraw-Hill, Inc.; Mulder, M., *Basic Principles of Membrane Technology*. Second ed. 1996: Kluwer Academic Publishers.

Parameters that may be varied to optimize the fractionation process include temperature, pH, choice of electron donor, starting concentration of uranium-containing species, choice of uranyl counterion, choice of microorganism, cell concentration, length of incubation and degree of reduction. The process is preferably carried out at a temperature and pH suitable for metabolic activity of the particular microorganisms selected. Preferred temperatures and pH ranges are known in the art. For example, optimum growth for *Shewanella oneidensis* occurs at 30° C., however, some strains can grow at temperatures up to 40° C. Most bacteria listed in Table 1 grow optimally between 15 and 35° C. Some *Shewanella* are psychrophiles (i.e., can grow at 4° C.), and some species of *Clostridium* and *Pyrobaculum* are thermophiles According to certain embodiments of the invention the process is carried out at room temperature. According to various embodiments of the invention the pH is relatively close to neutral, e.g., between 5.5 and 8.5, between 6.0 and 8.0, between 6.4 and 7.6, between 6.6 and 7.4, between 6.8 and 7.2, or approximately 7.0. However, as mentioned above, certain bacteria preferentially exist at extremes of pH and temperature. Optimization may require systematically varying the time over which reduction and/or precipitation is performed in order to achieve maximum or desired fractionation efficiency. According to certain embodiments of the invention reduction is performed for a time period between 0.05 and 100 hours. According to various different embodiments of the invention reduction is performed for a time period between 0.1 and 50 hours, between 0.1 and 20 hours, between 0.1 and 10 hours, between 0.1 and 5 hours, etc. According to certain embodiments of the invention reduction is performed for at least 1 hour. According to certain embodiments of the invention the processes of reduction and precipitation are performed within these time ranges. According to other embodiments of the invention a reduction phase is followed by a precipitation phase, which may result in longer time total time periods.

It will typically be desirable to select a time period over which reduction is performed so as to obtain an optimum isotope separation. It will be appreciated that this time interval may depend upon particular features of the process employed, e.g., whether the process is continuous (in which case reduced uranium may be removed from the solution as it is produced, without necessarily requiring formation of a precipitate), or whether the process is a batch process. According to various embodiments of the invention the time period is selected so as to maximize $\delta^{235}U$ of the precipitate, to achieve the highest separation factor, etc.

In general, such a time period will be shorter than the time required to achieve maximum or complete reduction of the uranium present. For example, according to certain embodiments of the invention, reduction is performed for a time sufficient to reduce less than 80% of the uranium. According to certain embodiments of the invention, reduction is performed for a time sufficient to reduce less than 60% of the uranium, in which case at least 40% of the uranium remains in solution. According to certain embodiments of the invention, reduction is performed for a time sufficient to reduce less than 40% of the uranium. According to certain embodiments of the invention, reduction is performed for a time sufficient to reduce less than 20% of the uranium. According to certain embodiments of the invention, reduction is performed for a time sufficient to reduce less than 10% of the uranium. According to certain embodiments of the invention, reduction is performed for a time sufficient to reduce less than 5% of the uranium. According to certain embodiments of the invention, reduction is performed for a time sufficient to reduce less than 1% of the uranium. According to certain embodiments of the invention, reduction is performed for a time sufficiently short so that at least 20% of the uranium remains in solution. According to certain embodiments of the invention, reduction is performed for a time sufficiently short so that at least 40% of the uranium remains in solution. According to certain embodiments of the invention, reduction is performed for a time sufficiently short so that at least 60% of the uranium remains in solution. According to certain embodiments of the invention, reduction is performed for a time sufficiently short so that at least 80% of the uranium remains in solution. According to certain embodiments of the invention, reduction is performed for a time sufficiently short so that at least 90% of the uranium remains in solution. According to certain embodiments of the invention, reduction is performed for a time sufficiently short so that at least 95% of the uranium remains in solution. According to certain embodiments of the invention, reduction is performed for a time sufficiently short so that at least 99% of the uranium remains in solution. It is noted that the preceding discussion refers to optimum time periods for a single round of reduction and precipitation. As discussed below, it will generally be preferable to perform multiple rounds of reduction and precipitation to achieve the desired degree of enrichment.

Separation of Uraninite from Soluble Uranyl. Precipitated uraninite can be separated from any remaining uranyl-containing compounds by any of a variety of methods including, but not limited to, centrifugation, filtration or preferential sorption procedures. While not wishing to be bound by any theory, it is believed that the first step in the reduction process is sorption of the uranyl ion to the cell surface (see results section below). Thus if a method that removes both the insoluble $UO_2$ and bacteria is employed (e.g., centrifugation), it may be desirable to treat the removed material in order to re-solubilize (desorb) any $UO_2^{2+}$ sorbed to bacteria since this material will not have undergone enrichment. An example of such treatment is washing of the bacterial fraction for short time periods (minutes) with a hydrochloride acid solution in the concentration range of 0.1 M to 1.0 M. Following resolubilization of the $UO_2^{2+}$ the bacteria and insoluble $UO_2$ may be removed.

An appropriate separation system may take into consideration the fact that bioreduced uraninite may precipitate largely as extremely small particles (e.g., ranging from <3 nm in diameter down to subnanometer diameter sizes) as well as aggregated particles and particle coatings on bacterial surfaces (Suzuki 2002). According to certain embodiments of the invention an organic polymer is provided in the medium as growth of uraninite crystals from orientated aggregates of uraninite may be mediated by such polymers. (Suzuki 2002) This may be particularly helpful when low uranium concentrations are used.

Separation of Reduced Uranium Without Formation of Precipitate. According to certain embodiments of the invention molecules comprising reduced uranium are removed from the starting material without requiring formation of a precipitate, e.g., they are removed directly from the solution phase. The separation typically involves extracting the reduced molecules, e.g., by first forming an extractable complex under the correct conditions. According to certain embodiments of the invention, after exposure to the microorganisms, the solution is treated with a solvent that extracts the reduced uranium into an organic phase or separate phase. The organic or separate phase contains the enriched uranium.

In order to form an extractable complex, the solution, certain organic ligands (e.g., thenoyltrifluoroacetone) that form a complex with $UO_2$ but not with $UO_2^{2+}$ may be added to the solution. The organic complex can be extracted into an organic phase or onto an organic coated solid support. The extracted reduced uranium is removed from the aqueous solution containing the oxidized uranium. The reduced uranium can be reextracted into the aqueous phase for reoxidation and further exposure to uranium-reducing microorganisms (and thus further enrichment) or collected. Other means of chemical separation not requiring the formation of a precipitate may also be used, including methods that do not involve extraction into an organic phase but rather into a different separate phase. In addition, physical methods of separation may also be used. According to certain embodiments of the invention separation methods based on the different charges of $UO_2$ and $UO_2^{2+}$ are used.

To increase the solubility of uraninite steps involving exposure to the microorganisms (or enzymes in the case of a cell-free system) may be performed at an elevated temperature. Thermophilic microorganisms, capable of living at elevated temperatures, or enzymes derived from such microorganisms, may be used. According to certain embodiments of the invention exposure to microorganisms is performed at a temperature of at least 50° C., or at least 90° C. According to certain embodiments of the invention exposure to microorganisms is performed at a temperature between 50° C. and 100° C., or between 90° C. and 100° C.

The invention thus provides a method for separating isotopes of an actinide element comprising steps of: (i) providing a composition comprising molecules comprising an actinide element, wherein at least some of the molecules include a first isotope of the actinide element and at least some of the molecules include a second isotope of the actinide element; (ii) exposing the molecules comprising the actinide element to reducing activity of actinide element reducing microorganisms, thereby allowing reduction of a portion of the molecules comprising the actinide element to form reduced molecules, wherein the reduced molecules contain a higher proportion of the second isotope relative to the first isotope than was present in the original composition, thereby effecting a separation of the first and second isotopes; and (iii) effecting an increased separation of the first and second isotopes present in the reduced molecules using any suitable process. According to certain embodiments of the invention the actinide element is uranium. The method typically involves extracting some or all of the reduced molecules from the composition and may also comprise the step of reextracting the reduced actinide containing molecules into an aqueous phase and either reoxidizing them or collecting them. According to certain embodiments of the invention the process is optimized, e.g., in order to achieve the maximum separation factor. For example, the length of time of exposure may be selected to achieve the maximum separation factor.

In general, either batch or continuous processes may be used for the embodiments of the invention in which reduced uranium is removed without formation of a precipitate. Continuous processes may allow achievement of a higher separation factor. Chemical or other separation methods not involving formation of a precipitate may also be employed in conjunction with the cell-free enrichments systems described herein.

Iteration. Even with an optimized process, in order to achieve significant enrichment of the starting material it will in general be necessary to perform multiple iterations, i.e., repetitions, of the reduction and precipitation or chemical separation processes. Therefore, according to certain embodiments of the invention $UO_2$ precipitate or separated $UO_2$ is re-oxidized and again subjected to reduction and precipitation (or other separation, e.g., chemical separation) until the desired enrichment is achieved. In general, re-oxidation can be achieved using any of a variety of methods employing, for example, ozone, chemical oxidants, or electrodes. Following re-oxidation, the material may then be converted into a form suitable for repetition of the process, i.e., for another round of reduction and enrichment.

Any of a variety of methods for oxidation of $UO_2$ may be used. For example, a process in which $UO_2$ is treated with nitric acid may be used. The $UO_2$ is exposed to nitric acid, e.g., by placing it in nitric acid, which leads to the formation of uranyl. The rate of uranyl formation increases with increasing solution temperature. It is noted that this process may lead to introduction of nitrate, which should preferably be removed before the uranyl is reintroduced to the bacteria for precipitation. One method for removal of the nitrate is to precipitate the uranyl as a hydroxide by the addition of base. The uranyl hydroxide solid can be washed with water to remove the nitrate. Once the nitrate is removed by washing, the solid uranyl hydroxide can be dissolved by the addition of an appropriate acid such as HCl or acetic acid.

Other methods for oxidation of the $UO_2$ for further enrichment include the addition of ozone or peroxide ($H_2O_2$). These methods have the advantage of permitting oxidation without introducing nitrate. For ozone the solid $UO_2$ can be collected and placed in a solution. Ozone can be bubbled through the solution, oxidizing the $UO_2$ solid to soluble $UO_2^{2+}$. The solution can be collected, treated with air to remove any remaining ozone, and directly introduced into a media with bacteria for further reduction. The ozone method has a number of advantages. Ozone is easy to produce, is used in large scale processes, and is easily removed (by sparing with air) to yield an appropriate solution for reintroduction into the enrichment process.

For oxidation by $H_2O_2$, a concentrated peroxide solution can be added directly to collected $UO_2$. Upon oxidation, the $UO_2^{2+}$ goes into solution. Preferably the unreacted peroxide is removed prior to reintroducing the solution to media for further enrichment by bacteria.

To achieve reduction with electrodes, an oxidizing potential is applied. The uranium is oxidized and goes into solution. This method is typically used for controlling redox for elements in the solution phase and may exhibit slower kinetics when used for solids, as here.

Preferably the overall process is repeated until the enriched material consists of at least 2% $^{235}U$. Yet more preferably the process is repeated until the enriched material consists of at least 2.5% $^{235}U$. Still more preferably the process is repeated (iterated) until the enriched material comprises at least 3% $^{235}U$, e.g., between 3% and 4%. According to certain embodiments of the invention the process is repeated until the enriched material comprises between 4% and 20% $^{235}U$ or even higher percentages. While commercial reactors typically use fuel containing between 3% and 4% $^{235}U$, some proposed fuels contain up to 20% $^{235}U$. Note that the percentages refer to the percent $^{235}U$ relative to the total amount of U rather than to the percent $^{235}U$ by weight in the material (since presence of other elements such as oxygen contributes weight). As used herein, the terms "approximately" or "about" in reference to a number are taken to include numbers that fall within a range of 5% in either direction (greater than or less than) the number unless otherwise stated or otherwise evident from the context. At any stage the isotope content of the precipitate and/or the degree of enrichment (e.g., fold enrichment, absolute percent of either isotope, etc.) may be determined using, for example, the methods described in Examples 1 and 2. Alternatively, other methods of achieving additional enrichment may be used. Uranium in the enriched uraninite precipitate may be converted into other chemical forms suitable, for example, for use as nuclear fuel. Possible fuel forms in addition to $UO_2$ include U metal, uranium nitride (UN), uranium carbide (UC), and uranium sulphide (US). Other fuels containing U include $ThO_2$—$UO_2$ and $PuO_2$—$UO_2$. All these species and solid solutions can be formed from $UO_2$ as the starting material. The enriched U may also be converted to $UF_6$ for further enrichment by conventional means.

Cell-free Systems for Uranium Isotope Separation. Considerable evidence suggests that cytochrome c enzymes, particularly cytochrome c3, play a key role in reducing U(VI) in various microorganisms (Lovley, 1993a). For example, the $H_2$-dependent reduction of U(VI) can be achieved by purifying cytochrome c3 and hydrogenase from *D. vulgaris* and incubating uranyl-containing molecules in the presence of the purified enzymes, with $H_2$ as an electron donor (Lovley, 1993a). Similar cell-free systems may be used to separate uranium isotopes in accordance with the methods of the present invention. Various c-type cytochromes are also believed to be involved in metal reduction in other metal-reducing microorganisms (Lovley 1993b; Roden and Lovley, 1993.) Cytochrome c3 mutants that show decreased ability to reduce U(VI) relative to wild type have been isolated, further confirming the importance of this enzyme (Payne, 2002).

Accordingly, the invention provides a method of separating isotopes of an actinide element comprising steps of: (i) providing a composition comprising molecules comprising an actinide element, wherein at least some of the molecules include a first isotope of the actinide element and at least some of the molecules include a second isotope of the actinide element; (ii) incubating the molecules comprising the actinide element with an actinide reducing enzyme obtained from an actinide element reducing microorganism, thereby allowing formation of a precipitate comprising the actinide element, wherein the precipitate contains a higher proportion of the second isotope relative to the first isotope than was present in the original composition, thereby effecting a separation of the first and second isotopes; and (iii) effecting an increased separation of the first and second isotopes present in the precipitate using any suitable process. According to certain embodiments of the invention the actinide reducing enzyme is a cytochrome c enzyme. In certain embodiments of the invention the cytochrome c is a cytochrome c3. According to certain embodiments of the invention purified hydrogenase obtained from an actinide element reducing microorganism and/or an electron donor other than hydrogenase is present during the incubating step.

While the reduction of U(VI) to U(IV) may occur at a rate comparable to or greater than that of the cell-based system, precipitation of uraninite may take place more slowly than in the cell-based system described above, possibly due to the lack of bacterial surfaces to provide nucleation sites for uraninite precipitation. Therefore, according to certain embodiments of the invention a material (e.g., an organic polymer) may be added during the incubating step to increase the rate of precipitation. Alternately, the reduced U(IV) can be chemically separated from the solution, e.g., by extraction as described elsewhere herein.

The overall process may also be divided into two stages, e.g., a first stage in which the enzyme(s) reduce U(VI) to U(IV), and a second stage in which uraninite precipitate forms. Accordingly, the invention provides a method of separating isotopes of an actinide element comprising steps of: (i) providing a composition comprising molecules comprising an actinide element, wherein at least some of the molecules include a first isotope of the actinide element and at least some of the molecules include a second isotope of the actinide element; (ii) incubating the molecules comprising the actinide element with an actinide reducing enzyme obtained from an actinide element reducing microorganism, thereby allowing reduction of the actinide element to form a reduced actinide element; (iii) removing the reduced actinide element; (iv) further incubating the reduced actinide element, thereby allowing formation of a precipitate comprising the reduced actinide element, wherein the precipitate contains a higher proportion of the second isotope relative to the first isotope than was present in the original composition, thereby effecting a separation of the first and second isotopes; and (v) effecting an increased separation of the first and second isotopes present in the precipitate using any suitable process. According to certain embodiments of the invention the actinide reducing enzyme is a cytochrome c enzyme. According to certain embodiments of the invention the cytochrome c is a cytochrome c3. According to certain embodiments of the invention purified hydrogenase obtained from an actinide element reducing microorganism is present during the incubating step. In certain embodiments of the invention an electron donor other hydrogenase is present during the incubating step. As in the methods employing whole cells, in general it will be necessary to subject the precipitate to multiple rounds of reduction, precipitation, and re-oxidation in order to achieve the desired level of enrichment. Process parameters, e.g., temperature, pH, times, starting uranium species, etc., may be optimized as described for the methods employing whole cells.

Crude cell lysates or fractions thereof (e.g., cytoplasmic or membrane fractions) of a cellular extract may be used. However, according to certain preferred embodiments of the inventive methods described in this section, the cytochrome c is isolated and/or purified. The terms "isolated" and "purified" are to be given their common meaning as accepted in the art. Accordingly, an "isolated" protein is a protein removed from its normal cellular environment. A "purified" protein, is a protein separated from most or essentially all the cellular constituents that would be present in a crude cell lysate, particularly other proteins. For example, if a crude cell lysate contains X % cytochrome c by weight, a preparation containing (2X) % cytochrome c is 2-fold purified. The degree of purity of a composition may be expressed in terms of the percent of total protein by weight contributed by a particular protein of interest. For example, a composition is 50% pure if it contains 50% by weight of the protein of interest. In the context of the methods of the invention, according to various embodiments of the invention a purified protein may be partially purified or fully purified (e.g., greater than 99% pure).

In general, any of the foregoing methods may be performed according to either a batch or a continuous process. According to certain embodiments of the invention the incubating step in any of the foregoing methods is performed in a fixed enzyme reactor.

Cytochrome c and/or hydrogenase enzymes can be isolated and/or purified from microorganisms that naturally manufacture this protein using purification methods well known in the art. Alternately, cytochrome c sequences from an actinide element reducing microorganism of interest may be expressed in cells that do not normally produce this particular cytochrome c using recombinant DNA techniques. For example, constructs comprising a coding sequence for a cytochrome c from an actinide element reducing microorganism operably linked to a suitable promoter may be introduced into cells that do not normally produce this cytochrome c. The suitable promoter may be any promoter that functions in the cells (i.e., that directs transcription of downstream sequences) and may be constitutive or inducible. Cytochrome c protein may be purified from the cells, and methods for producing cytochrome c on a large scale are known in the art. Hydrogenase may also be expressed and purified. Rather than including a physiological electron donor such as hydrogenase to reduce the cytochrome c, an alternate method such as electrochemical reduction can be used. It has been demonstrated that cytochrome c3 can be electrochemically reduced without the aid of intermediary electron carriers (Niki, 1977). Cytochrome c3-based bioreactors similar to those employed for removal of nitrate from contaminated waters may be employed (Mellor, 1992).

Improved Microbial Strains for Uranium Isotope Separation. The present invention encompasses the use of mutants and/or genetically modified microorganisms having increased ability to separate uranium isotopes relative to wild type and enzymes obtained from such microorganisms. In particular, the invention encompasses the use of a microorganism that overexpresses a protein that reduces an actinide element. For example, the microorganism may overexpress a cytochrome c protein, e.g., a cytochrome c3 protein in the practice of any of the methods described above. The invention further encompasses the use of a microorganism that overexpresses a hydrogenase protein. Overexpression may be achieved using methods well known in the art, e.g., introducing a vector encoding the protein of interest under control of a suitable promoter into the microorganism as described above. The microorganism may be a microorganism that possesses endogenous ability to reduce U(VI). However, it is not necessary that the microorganism possess endogenous ability to reduce U(VI) since such ability may be conferred by expressing the appropriate enzymes in the cell. Preferably the microorganism is one that can maintain metabolic activity under anaerobic conditions.

The invention also encompasses the use of a microorganism that expresses an altered cytochrome c protein, e.g., a cytochrome c3 protein, which protein has an increased level of uranium reducing ability relative to wild type levels. In this context the term "altered" is intended to convey that the sequence differs from the wild type sequence as a result of human manipulation, e.g., application of a mutagenic agent or application of an in vitro technique. Genes encoding altered cytochrome c proteins may be generated in vitro according to standard methods, e.g., site-specific mutagenesis, random mutagenesis (e.g., using PCR), etc. A library of such altered cytochrome c genes under the control of a suitable promoter may be introduced into microorganisms, which can then be screened to identify those that display enhanced ability to reduce U(VI) or to separate U(VI) isotopes. In general, since measurements of isotope separation are expensive and time-consuming, it will be preferable to screen for increased ability to reduce U(VI). The gene encoding the altered cytochrome c protein having increased ability to reduce U(VI) may be recovered and introduced into other microorganisms, further modified in vitro, etc.

The cytochrome c3 mutants with decreased ability to reduce U(VI) mentioned above retained significant ability to reduce U(VI) (approximately half the wild type level when lactate or pyruvate was used as the electron donor), suggesting that other pathways exist and other proteins are also important in reducing U(VI). Genes encoding such proteins may be identified by screening for mutants that display absent or decreased ability to reduce U(VI), as described, for example, in (Wade and DiChristina, 2000). The wild type version of such genes may be identified by introducing a library encoding wild type genes into the mutant microorganism and identifying cells whose ability to reduce U(VI) is restored. The library construct, which includes the wild type gene, can be recovered according to standard techniques. The genes so identified are likely to play an important role in a U(VI) reduction pathway. These genes may then be altered in vitro as described above for cytochrome c, and the altered versions introduced into microorganisms under control of a suitable promoter, which may then be tested to determine whether expression of the altered protein enhances the ability of the microorganism to reduce U(VI).

Any of the methods for separating isotopes of uranium or other actinide elements described above may be performed using microorganisms that overexpress a gene encoding a protein involved in a pathway leading to reduction of the actinide element. According to certain embodiments of the invention the microorganisms express an altered cytochrome c protein, which altered cytochrome c protein displays an increased ability to reduce the actinide element relative to a wild type version of the protein. The methods may also be performed using microorganisms that express an altered version of a gene encoding a protein involved in a pathway leading to reduction of the actinide element, which altered cytochrome c protein displays an increased ability to reduce the actinide element relative to a wild type version of the protein. By "a gene encoding a protein involved in a pathway leading to reduction of the actinide element" is meant at a minimum any gene whose deletion (alone or in combination with other genes, particularly in combination with homologous genes) results in a greater than 10% decrease in the ability of the microorganism to reduce the actinide element while not causing an equal or greater decrease in growth rate or metabolic activity; or a gene whose overexpression alone or in combination with overexpression of additional genes results in a greater than 10% increase in the ability of the microorganism to reduce the actinide element; or a gene that encodes a protein that is a component in an in vitro system that reduces the actinide element. One of ordinary skill in the art will readily be able to test candidate genes to determine whether they meet the above criteria. The involvement of the gene in the pathway may be direct (e.g., as a member of an electron transport chain) or indirect (e.g., a protein that activates a member of an electron transport chain). Genes not falling within the scope of the above definition may nonetheless be involved in a pathway leading to reduction of the actinide element, and their involvement may be established using other methods.

The following reference works describe standard techniques in molecular biology, protein expression and purification, etc., that may be employed for the purposes described above: *Current Protocols in Molecular Biology, Current Protocols in Protein Science*, and *Current Protocols in Cell Biology*, John Wiley & Sons, N.Y., edition as of 2002; Sambrook, Russell, and Sambrook, *Molecular Cloning: A Laboratory Manual*, 3$^{rd}$ ed., Cold Spring Harbor Laboratory Press, Cold Spring Harbor, 2001. One of ordinary skill in the art will be able to select appropriate genetic elements, growth conditions, etc., for the microorganisms utilized herein.

Comparison of uranium isotope separation methods. Isotope separation methods may be compared by determining the separation factor. The separation factor expresses the degree of concentration or depletion achieved in the enrichment. This value can be determined, for example, from measurements of the concentration of the enriched isotope in different solutions or calculated from kinetic data. For the methods described herein, the solution concentration of each isotope can be evaluated at a series of time points (as described in detail in the Examples) and fitted to first order kinetics using the equation:

$$[U]_t = [U]_0 e^{-kt} \quad \text{(Eq. 1)}$$

where $[U]_t$ is the concentration of the isotope at time t and $[U]_0$ is the initial isotope concentration. For any given uranium isotope concentration, the resulting rate is given by $$\text{Rate} = k[U] \quad \text{(Eq. 2)}$$

where k is expressed in terms of $(\text{hr}^{-1})$, [U] is the isotope concentration in moles/L, and the overall rate is in moles $L^{-1}$ $\text{hr}^{-1}$.

The isotope separation methods previously known in the art require uranium hexafluoride as the uranium species. The separation ratios are based upon different values for the various methods and are described in detail in Benedict, et al., 1981. Briefly, the distillation method ratio is determined from relative volatility, and the chemical exchange ratio is found from the equilibrium constants for the different isotopes between the hexafluoride and $UF_5NOF$. The gaseous diffusion ratio is based on the square root of the ratio of heavy and light uranium hexafluoride. For the gas centrifuge technique, the ratio is based on the equation $$\exp\frac{(m_{238} - m_{235})v^2}{2RT} \quad \text{(Eq. 3)}$$

where m is the mass of the heavy and light isotope chemical species, v is the peripheral velocity of the centrifuge (m/s), T is the temperature and R is the ideal gas constant. For the gas centrifuge technique the ratio includes parameters such as temperature and centrifuge velocity.

The rate constants for a uranium isotope separation process performed in accordance with a representative embodiment of the methods of the invention may be calculated using the data presented in Example 2. The resulting rate constants are given below (Table 3) and have a correlation coefficient greater than 0.98.

TABLE 3

| Isotope | k (hr$^{-1}$) |
|---|---|
| $^{235}U$ | $4.17 \pm 0.20 \times 10^{-2}$ |
| $^{238}U$ | $3.83 \pm 0.15 \times 10^{-2}$ |

Separation factors for $^{235}U$ and $^{238}U$ with the different methods mentioned above are given in Benedict, et al., 1981 and are presented in Table 4 together with the separation factor calculated for the method of the invention. The embodiment of the invention described in Example 2 achieved a separation ratio close to that achieved by the gas centrifuge method and considerably higher than that achieved by the other methods. This data indicates that optimization of the isotope separation technique should result in a ratio greater than the value for the gas centrifuge technique, the most widely used commercial enrichment method in use today.

TABLE 4

| Method | ratio |
|---|---|
| Distillation | 1.00002 |
| Monothermal Chemical Exchange | 1.0016 |
| Gaseous Diffusion | 1.00429 |
| Gas Centrifuge | 1.162 |
| Bacterial Separation | 1.06 ± 0.04 |

The foregoing description is to be understood as being representative only and is not intended to be limiting. Alternative methods and materials for implementing the invention and also additional applications will be apparent to one of skill in the art, and are intended to be included within the accompanying claims.

EXAMPLES

Example 1

Uranium Enrichment by *Shewanella oneidensis*

Materials and Methods

Bacterial strain and culture conditions. To generate sufficient biomass for the fractionation experiments, *Shewanella oneidensis* MR-1 (ATTC 7005500) was grown for approximately 24 h at RT in tryptic soy broth (Difco) under aerobic conditions. Cells were harvested in mid-exponential phase by centrifugation and washed three times with anaerobic $NaHCO_3$ (2 g/L) buffer before transfer to the fractionation medium.

A bicarbonate-buffered freshwater medium was used [described in detail in Kuai et al., 2001]. It contained 5 mM lactate as carbon source and was buffered to pH 6.8 by adding $NaHCO_3$ (1.9 g/l). Salts (in g per liter) were $NH_4Cl$ (0.25), KCl (0.5), $CaCl_2.2H_2O$ (0.15), NaCl (1.0), $MgCl_2.6H_2O$ (0.62). Vitamins (in mg per liter) were p-aminobenzoic acid (0.05), thiamine-HCl (0.02), pyridoxine-HCl (B6) (0.1), and cyanocobalamin (B12) (0.001). Trace minerals added from a 1000-fold concentrated mixture were (in mg per liter) $MnCl_2.4H_2O$ (0.1), $CoCl_2.6H_2O$ (0.12), $ZnCl_2$ (0.07), $H_3BO_3$ (0.06), $NiCl_2.6H_2O$ (0.025), $CuCl_2.2H_2O$ (0.015), $Na_2MoO_4.2H_2O$ (0.025), $FeCl_2.4H_2O$ (1.5).

Uranium containing species. The uranium was added as the species uranyl acetate, which was prepared from $U_3O_8$ as follows. The starting material was $U_3O_8$ with 50% $^{235}U$. The solid was dissolved in nitric acid, forming the $UO_2^{2+}$. The uranyl was precipitated by the addition of $NH_4OH$, forming uranyl hydroxide solid. The solid was washed 5 times with water. After washing, the solid was dissolved in acetic acid. The solution was brought to dryness forming the uranyl acetate salt. The starting material was a U500 standard, New Brunswick Laboratories, which contains $^{235}U$ and $^{238}U$ in a 1:1 ratio and does not contain other U isotopes.

Uranium isotope separation process. The medium was equilibrated for 24 h in an anaerobic glove box (Coy) under $H_2:CO_2:N_2$ (5:15:balance) atmosphere and buffered with $NaCO_3$, after which 10 mL aliquots were dispensed into separate tubes to generate a set of replicates, and uranyl-acetate solution containing equimolar amounts of $^{235}U$ and $^{238}U$ (U500 standard) was added to each tube to 1.2 mM. After 1 h, cells were injected into each tube to a final concentration of approximately $10^8$ per mL. The solutions incubated with intermittent shaking. At specific time points (FIG. 1) two replicate tubes were treated by addition of 1 ml 100% ethanol to kill the bacteria. The tubes were stored frozen until further analysis. A control experiment, consisting of two tubes that lacked bacterial biomass, was treated identically.

Uranium analysis. Uranium concentration was determined for both the solution and the precipitate, and uranium isotopic composition was analyzed for the solution only. To separate particles from the solution, defrosted samples were transferred to 15 ml polypropylene tubes and centrifuged for 30 min at 3,700 rmp in a Sigma 204 centrifuge. Subsequently, the supernatant was filtered through 0.2 µm pore size filters to remove any remaining uraninite particles and biomass. To each tube containing precipitate, 0.25 mL concentrated $HNO_3$ was added while 0.5 ml of the supernatant was combined with 4.5 mL 2% $HNO_3$. These solutions were then used for uranium concentration determination and isotopic fractionation measurement (supernatant only).

Uranium concentration analysis. In both Examples 1 and 2, uranium concentration was determined by Inductively Coupled Plasma-Atomic Emission Spectrometry (ICP-AES). A series of standards were made in the same medium in which the fractionation procedure was performed, in concentrations up to 2.0 mM. The standards were used to correlate the output (counts per second/intensity) from the ICP-AES to actual concentration. After ignition of the argon torch and rinsing of the inlet and outlet tubing, the standards were introduced into the ICP-AES followed by the samples. After approximately every 10 samples two standards were re-introduced and the output checked for consistency. After measurement of the samples the standards were remeasured. The measurements of all standards collected during the experiment were averaged to generate the standard curve.

Uranium isotopic analysis. Uranium isotopic composition of the supernatant was determined by flash evaporation thermal ionization mass spectrometry Sector 54 (Micromass) and confirmed by ICP magnetic sector multiple collector mass spectrometer (Isoprobe-Micromass). For TIMS measurements the source was equipped with a twenty positions turret assembly. Demountable triple filament arrangements were used for U isotope ratio measurements in order to independently control the sample evaporation and ionization temperatures. The two evaporating filaments were made of tantalum and the ionizing filament was made of rhenium. The detection system consisted of seven Faraday collectors and a Daly detector ion-counting system. The U samples were analyzed by TIMS using 2 µg samples deposited on the side filament. For ICP-MS samples were introduced into the plasma using a peristaltic pump, a micronebulizer, and a water-cooled cyclonic spray chamber. Bias in the spectrometric measurement of uranium isotopes is due to mass discrimination and was corrected by introduction of standards, an accepted method as described, for example, in Taylor, et al., 2002.

A National Bureau of Standard (NBS) SRMs U-500 reference material (the same material as used to produce the uranyl acetate) was selected to correct for bias. Standards were prepared with high purity water and 60% nitric acid, resulting in solutions with concentrations ranging from 50 to 500 ppb. In order to obtain precise measurements, standards and samples were arranged in the following sequence: standard 1-sample-standard 2. The measured $^{235}U/^{238}U$ ratio for samples was corrected to generate an actual (real) value using a correction factor F calculated as:

$$F = (^{235}U/^{238}U_{NBS\ certified})/[(^{235}U/^{238}U_{standard\ 1} + ^{235}U/^{238}U_{standard\ 2})/2]$$

where standard 1 and 2 are the SRM U500 standard analyzed before and after the sample, respectively. The ratio was then calculated as follows:

$$(^{235}U/^{238}U)_{real} = (^{235}U/^{238}U)_{measured} \times F$$

The overall accuracy of the measurements was defined by:

$$\text{Accuracy}(\%) = [(^{235}U/^{238}U)_{real} - (^{235}U/^{238}U_{certified}) *100]/(^{235}U/^{238}U_{NBS\ certified})$$

To guarantee the consistency of the results, two other NBS standards (SRM U750 and SRM U200) were introduced in one run and analyzed the same way.

Results

Figure 1:
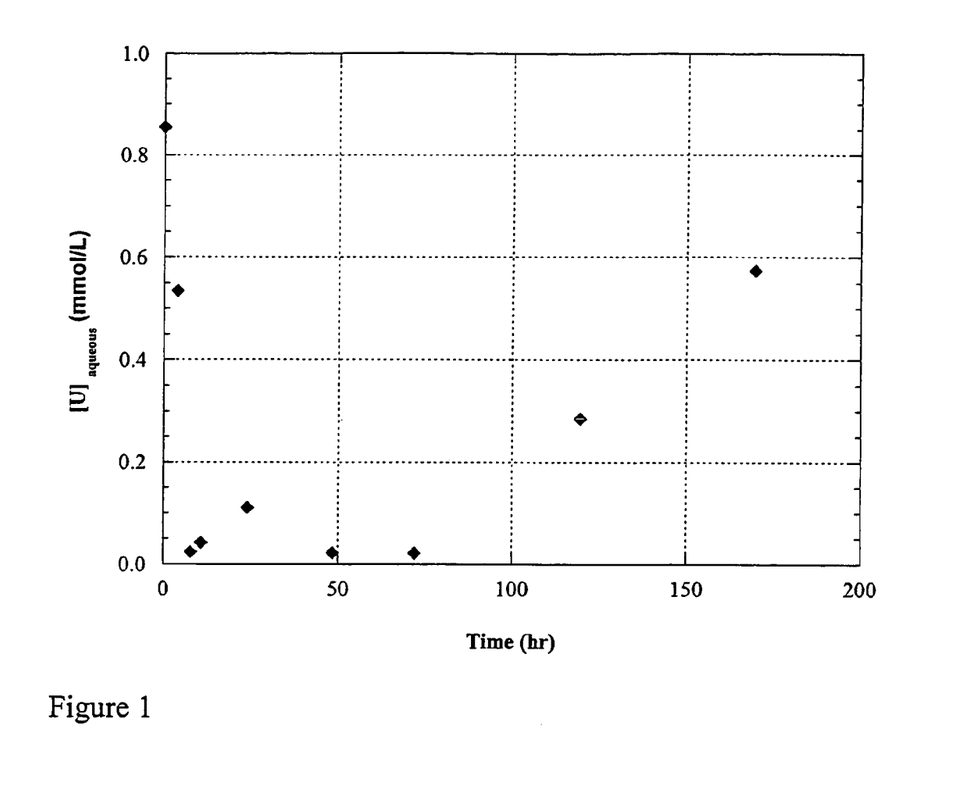
FIG. 1 is a graph showing the concentration of total uranium in solution during the time course of a fractionation procedure in which *S. oneidensis* bacteria were cultured in medium containing uranyl acetate.

FIG. 1 shows the concentration of uranium in solution as a function of time during the isotope separation procedure. The figure demonstrates near hyperbolic (first order) kinetics for uranium precipitation, as expected for an active metabolic process. An initial rapid drop in uranium concentration is evident. This was followed by a resolubilization of uranium with time during the experiment, e.g., at times greater than 100 hours. While not wishing to be bound by any theory, the inventors suggest that this may reflect the presence of oxygen, the role of organic ligands, and/or formation of colloidal $UO_2$. This phenomenon was not observed in other experiments exploring the reduction kinetics of uranium (Example 2 and data not shown). Variation between replicate tubes is evident but is accounted for by mass balance analysis of uranium remaining in solution and collected by centrifugation. This variation was subsequently reduced by employing a batch approach, as described in Example 2.

Samples from different time points were analyzed for uranium isotope composition and compared to the U500 standard. This provided a $\delta^{235}U$ value expressing the change in $^{235}U$ concentration in the sample compared to the standard:

$$\delta^{235}U = \left( \frac{\left[ \left(\frac{[^{235}U]}{[^{238}U]}\right)\text{sample} - \left(\frac{[^{235}U]}{[^{238}U]}\right)\text{standard} \right]}{\left(\frac{[^{235}U]}{[^{238}U]}\right)\text{standard}} \right) 1000$$

Figure 3:
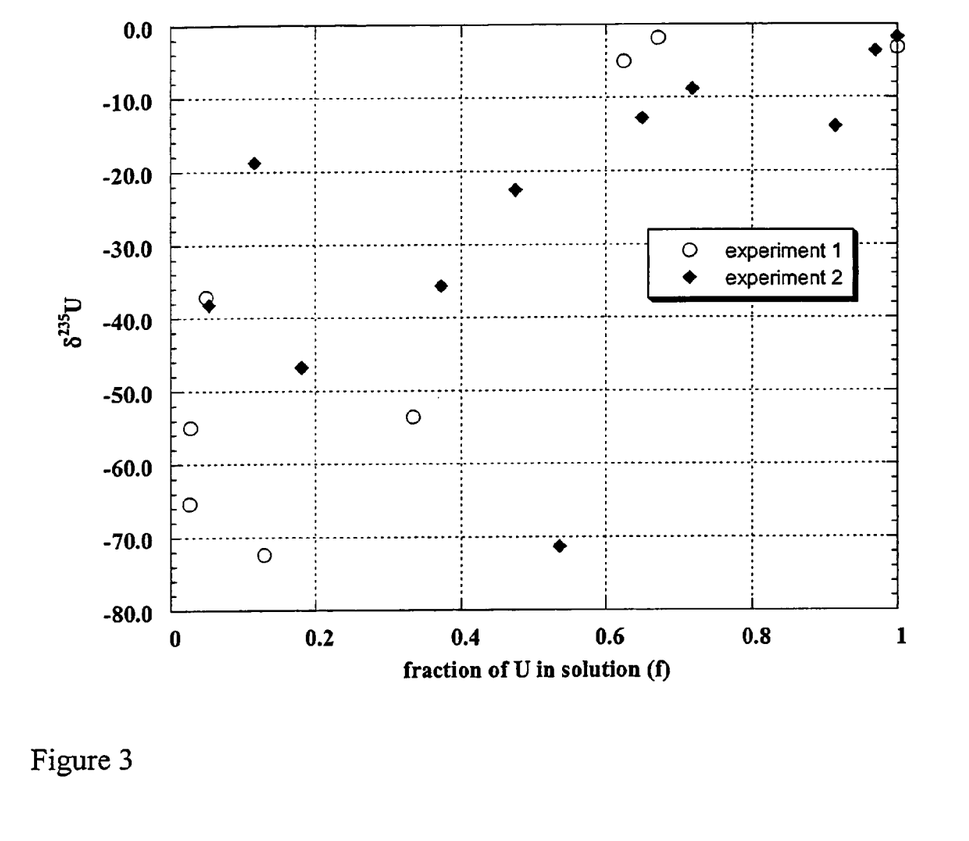
FIG. 3 shows the $\delta^{235}U$ as a function of f, the fraction of uranium remaining in solution in two independent experiments. Data from Experiment 1 is indicated by circles. Data from Experiment 2 is indicated by diamonds. Note that the point at position (1, 0.0) at the upper right of the figure representing the beginning of both experiments, is indicated by a superimposed circle and diamond. The symbols represent replicate ICP-MS determination of isotopic composition, i.e., the points are averages of three measurements of the same sample.

This value was calculated for samples collected at various time points and was graphed as the change of isotope composition ($\delta^{235}U_f$) as a function of the fraction of uranium remaining in solution (f). FIG. 3 shows $\delta^{235}U_f$ plotted as a function of f for the experiments described in this and the following example. Data from this example are represented by circles. The symbols represent replicate ICP-MS determination of isotopic composition (i.e., the points are the average of two replicates.) A $\delta^{235}U_f$ value of 0 would indicate that no isotope separation occurred (i.e., [$^{235}U/^{238}U$] is the same for both sample and standard). It is evident that significant isotope separation occurred, resulting in a considerable decrease in the relative $^{235}U$ content of the solution samples as compared with the standard, implying a corresponding increase in the relative $^{235}U$ content of the precipitate as compared with the standard. Note that the $\delta$ values are negative because the solution, which shows an increase in $^{238}U$, was measured. Thus in terms of the equation given above, the solution is the "sample". The data for this experiment (Experiment #1) and the experiment in Example 2 (Experiment #2) are presented in Table 5.

TABLE 5

| f | 1st experiment | 2nd experiment |
|---|---|---|
| 0.025 | −91.674 | |
| 0.026 | −65.421 | |
| 0.027 | −54.986 | |
| 0.049 | −37.147 | |
| 0.053 | | −38.191 |
| 0.117 | | −18.797 |
| 0.130 | −72.439 | |
| 0.182 | | −46.802 |
| 0.334 | −53.545 | |
| 0.373 | | −35.615 |
| 0.475 | | −22.511 |
| 0.536 | | −71.315 |
| 0.625 | −5.110 | |
| 0.650 | | −12.849 |
| 0.671 | −1.863 | |
| 0.718 | | −8.873 |
| 0.915 | | −13.970 |
| 0.969 | | −3.671 |
| 1.000 | −3.227 | −1.745 |

Example 2

Uranium Enrichment by *Shewanella oneidensis*—Dependence on Presence of Living Cells Materials and Methods Bacterial strain and culture conditions were essentially identical to those described in Example 1.

Uranium containing species. Uranium was added as the species uranyl acetate, and was prepared as described in Example 1.

Uranium isotope separation process. The medium was equilibrated for 24 hr in an anaerobic glove box (Coy) under $H_2:CO_2:N_2$ 95:15:balance) atmosphere, after which 100 mL aliquots were dispensed into separate tubes. One tube was used for each experimental condition (live cells, heat-killed cells, inhibited cells, no cells). Filter sterilized uranyl-acetate solution containing 1:1 $^{235}U:^{238}U$ (prepared from a U500 standard, New Brunswick Laboratories) was added to 1.4 mM and the pH of the medium adjusted to 7. After 1 hr, washed cells were injected to a final concentration of $4.7 \times 10^8$ per ml, and the solutions were incubated under constant, gentle stirring. At each time point, three replicates of one ml were withdrawn from the medium, killed by addition of 0.11 mL formaldehyde and stored frozen until further analysis. The following three controls were included: (1) no cells added (C1); (2) addition of heat killed cells (C2); and (3) addition of cells inhibited by molybdate (10 mM) and cyanide (50 mM) (C3). Other than these modifications, the controls were treated identically to the other samples.

Uranium analysis. Uranium concentration was determined for both the solution and the precipitate, and uranium isotopic composition was analyzed for the solution only. The three one mL subsamples taken for each time point were combined, and uraninite precipitate and cell material were separated from uranyl-acetate remaining in solution by passage through 0.2 µm pore size polycarbonate filters (Whatman). For a one mL subsample of each filtrate, carbon was subsequently burned off by muffling for 4 hr at 550° C. to control for potential interference of organic matter in the isotopic analysis. A one mL subsample of each filtrate was used without muffling. Finally, uranium in all samples was dissolved in 0.1 M $HNO_3$, and the samples were split for determination of uranium concentration and isotopics.

Uranium concentration analysis and uranium isotopic analysis were performed essentially as described in Example 1.

Results

Figure 2:
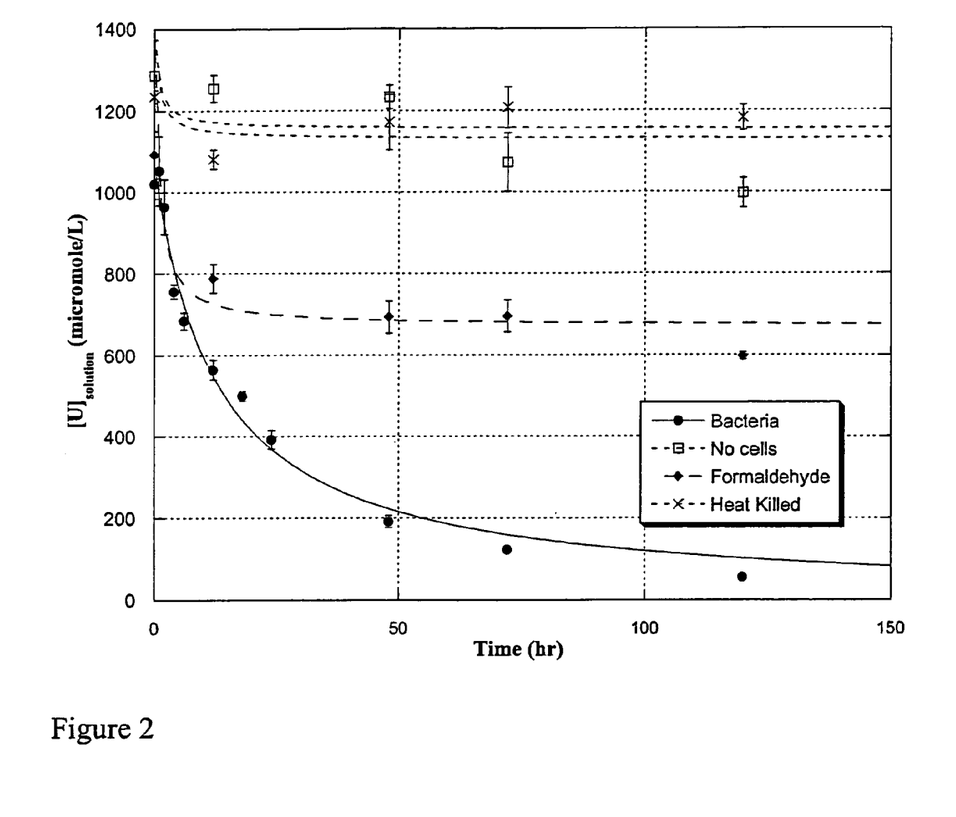
FIG. 2 is a graph comparing the concentration of total uranium in solution during the time course of a fractionation procedure in which *S. oneidensis* bacteria were cultured in medium containing uranyl acetate (circles) with the concentration of total uranium in an otherwise identical solution in the presence of either no cells (squares), formaldehyde-treated *S. oneidensis* bacteria (diamonds), or heat-killed *S. oneidensis* bacteria (crosses).

FIG. 2 shows the concentration of total uranium in solution (i.e., in the medium) during the time course of the isotope separation procedure. The plot demonstrates the near hyperbolic (first-order) kinetics for uranium precipitation as expected for an active metabolic process. In contrast to Example 1, there was no evidence of resolubilization of uranium. The variability between samples present in the experiment described in Example 1 was reduced by the batch approach employed here.

The controls (dead or inhibited cells) also showed a rapid initial drop in the concentration of uranium in solution. However, the level of soluble uranium quickly stabilized. While not wishing to be bound by any theory, it is likely that the initial drop in concentration may be attributed to sorption of uranyl ions to phosphate groups on the bacterial surfaces, a behavior that does not affect the reduction state of the uranium (data not shown). Furthermore, the decrease in soluble uranium in the samples containing live cells was accompanied by the accumulation of a dark brownish precipitate, which was shown to be the reduced uranium oxide (uraninite) by X-ray diffraction (data not shown). The data plotted in FIG. 3 are shown below in Table. 6.

change of isotope composition ($\delta^{235}U_f$) as a function of the fraction of uranium remaining in solution (f). FIG. 3 shows $\delta^{235}U_f$ plotted as a function of f for the experiment described in this and the previous example. Data from this example are represented by shaded diamonds. It is evident that significant isotope separation occurred, resulting in a considerable decrease in the relative $^{235}U$ content of the solution samples as compared with the standard, implying a corresponding increase in the relative $^{235}U$ content of the precipitate as compared with the standard. Note that the $\delta$ values are negative because the solution, which shows an increase in $^{238}U$, was measured. Thus in terms of the equation for $\delta$ given above, the solution is the "sample". Data for this experiment (Experiment #2) are presented in Table 5 above. Taken together with the results presented in Example 1, the data further suggest that under the conditions described here, in order to achieve maximum isotope separation the precipitate should be harvested while between approximately 50% and 90% of the uranium has become insoluble, i.e., while between approximately 10% and 50% of the uranium remains in solution.

The solution concentration of each isotope was evaluated at a series of time points and fitted to first order kinetics using the equation:

$$[U]_t = [U]_0 e^{-kt} \quad \text{(Eq. 1)}$$

where $[U]_t$ is the concentration of the isotope at time t and $[U]_0$ is the initial isotope concentration. For any given uranium isotope concentration, the resulting rate is given by $$\text{Rate} = k[U] \quad \text{(Eq. 2)}$$

where k is expressed in terms of $(hr^{-1})$, [U] is the isotopic concentration in moles/L, and the overall rate is in moles $L^{-1}hr^{-1}$. The resulting rate constants are given below (Table 3) and have a correlation coefficient greater than 0.98.

TABLE 6

| | MC ICP-MS | TIMS | | | |
|---|---|---|---|---|---|
| Time (h) | Sample | Sample | No Cells | Formaldehyde | Heat Killed |
| 0 | 0.9955 ± 0.0019 | 0.9946 ± 0.0008 | 0.9951 ± 0.0006 | 0.9945 ± 0.0006 | 0.9969 ± 0.0004 |
| 1 | 0.9980 ± 0.0017 | 0.9965 ± 0.0029 | | | |
| 2 | 0.9871 ± 0.0125 | 0.9843 ± 0.0046 | | | |
| 4 | 0.9903 ± 0.0093 | 0.9894 ± 0.0029 | | | |
| 6 | 0.9881 ± 0.0115 | 0.9854 ± 0.0031 | | | |
| 12 | 0.9306 ± 0.0643 | 0.9271 ± 0.0055 | 0.9958 ± 0.0039 | 0.9944 ± 0.0053 | 0.9931 ± 0.0066 |
| 18 | | 0.9758 ± 0.0079 | | | |
| 24 | | 0.9627 ± 0.0156 | 0.9837 ± 0.0057 | 0.9939 ± 0.0023 | 0.9965 ± 0.0056 |
| 48 | 0.9611 ± 0.0371 | 0.9516 ± 0.0079 | 0.9958 ± 0.0044 | 0.9905 ± 0.0010 | 0.9943 ± 0.0039 |
| 72 | 0.9855 ± 0.0140 | 0.9795 ± 0.0006 | 0.9964 ± 0.0069 | 0.9899 ± 0.0016 | 0.9969 ± 0.0014 |
| 120 | | 0.9601 ± 0.0001 | 0.9917 ± 0.0066 | 0.9939 ± 0.0007 | 0.9955 ± 0.0376 |

Samples of solution from different time points were analyzed for uranium isotope composition and compared to the U500 standard, and a $\delta^{235}U$ value expressing the change in $^{235}U$ concentration in the sample compared to the standard was calculated as described in Example 1.

This value was calculated for samples of solution collected from each tube at various time points and was graphed as the

TABLE 3

| Isotope | k $(hr^{-1})$ |
|---|---|
| $^{235}U$ | $4.17 \pm 0.20 \times 10^{-2}$ |
| $^{238}U$ | $3.83 \pm 0.15 \times 10^{-2}$ |

As described above, these rate constants can be used to compute the separation factor for the isotope separation process. Comparison of the separation factor with those characteristic of other isotope separation processes indicates that optimization of the process described herein will yield even higher separation factors than the gas centrifuge technique.

Example 3

Uranium Enrichment by *Shewanella oneidensis*

A third experiment was carried out to confirm results of Examples 1 and 2. The goal was to apply additional precautions to eliminate even minute sources of contamination of the experimental samples with natural or depleted uranium. Although such contamination for the previous experiments in Examples 1 and 2 was deemed unlikely due to the already high standard of laboratory procedures, natural or depleted uranium in the uranium collected for isotope measurements in the experiment in Example 1 and 2 would produce bias measured as apparent fractionation of the isotopes. The third experiment was set up as in Example 2 with the following additional precautions
- all glassware, plastics and stirbars were washed in fresh 5% HCl overnight followed by a wash in fresh 1% HCl overnight rinsing with distilled $H_2O$
- all media and chemical solutions were prepared with Ultra-Pure water
- all chemicals used in the experiment were of ultrapure composition and new containers were opened for the experiment
- all uranium samples were taken up in UltraPure water
- stuffed tips were used for all pipetting steps to avoid contamination of samples with aerosols contained in pipetters
- disposable plastic filters and filter holders were used for each filtration The results of the experiment confirmed that fractionation was due to bacterial activity and not due to possible contamination by natural or depleted uranium. The control experiment showed a fractionation factor similar to the results of Examples 1 and 2.

EQUIVALENTS

Those skilled in the art will recognize, or be able to ascertain using no more than routine experimentation, many equivalents to the specific embodiments of the invention described herein. The scope of the present invention is not intended to be limited to the above Description, but rather is as set forth in the appended claims.

REFERENCES

Benedict, M., Pigford, T. H., and Levi, H. W.: Nuclear Chemical Engineering, $2^{nd}$ edition, McGraw-Hill, pg 813 (1981).
Caccavo, F. J., Coates, J. D., Rosello-Mora, R. A., Ludwig, W., Schleifer, K.-H., Lovley, D. R., and McInerney, M. J. (1996): *Geovibrio ferrireducens*, a phylogenetically distinct dissimilatory Fe(III)-reducing bacterium. *Arch. Microbiol.* 165, 370-376.
Caccavo, F. J., Lonergan, D. J., Lovley, D. R., Davis, M., Stolz, J. F., and McInerney, M. J. (1994): *Geobacter sulfurreducens* sp. nov., a hydrogen- and acetate oxidizing dissimilatory metal-reducing microorganism. *Appl. Environ. Microbiol.* 60, 3752-3759.
Coates, J. D., Bhupathyiraju, V. K., Achenbach, L. A., McInerney, M. J., and Lovley, D. R. (2001): *Geobacter hydrogenophilus, Geobacter chapellei* and *Geobacter griciae*, three new, strictly anaerobic, dissimilatory Fe(III)-reducers. *Int. J. Syst. Evol. Microbiol.* 51, 581-588.
Coates, J. D., Councell, T., Ellis, D. J., and Lovley, D. R. (1998): Carbohydrate oxidation coupled to Fe(III) reduction, a novel form of anaerobic metabolism. *Anaerobe* 4, 277-282.
Coates, J. D., Phillips, E. J. P., Lonergan, D. J., Jenter, H., and Lovley, D. R. (1996): Isolation of *Geobacter* species from diverse sedimentary environments. *Appl. Environ. Microbiol.* 62, 1531-1536.
Francis, A. J., Dodge, C. J., Lu, F., Halada, G. P., and Clayton, C. R. (1994): XPS and XANES studies of uranium reduction by *Clostridium sp. Environ. Sci. Technol.* 28, 636-639.
Francis, C. A., Obraztsova, A. Y., and Tebo, B. M. (2000): Dissimilatory metal reduction by the facultative anaerobe *Pantoea agglomerans. Appl. Environ. Microbiol.* 66, 543-548.
Fredrickson, J. K., Kostandarithes, H. M., Li, S. W., Plymale, A. E., and Daly, M. J. (2000): Reduction of Fe(III), Cr(VI), U(VI), and Tc(VII) by *Deinococcus radiodurans* R1. *Appl. Environ. Microbiol.* 66, 2006-2011.
Ganesh, R., Robinson, K. G., Reed, G. D., and Sayler, G. S. (1997): Reduction of hexavalent uranium from organic complexes by sulfate- and iron-reducing bacteria. *Appl. Environ. Microbiol.* 63, 4385-4391.
Gorby, Y. A. and D. R. Lovley: Enzymatic Uranium Precipitation, *Environ. Sci. Technol.*, Vol. 26, No. 1, 1992.
Grenthe, I., et al., *Chemical Thermodynamics of Uranium* (Nuclear Energy Agency, North-Holland, The Netherlands, 1992).
Heidelberg, J. F., et al., (2002) Genome sequence of the dissimilatory metal ion-reducing bacterium *Shewanella oneidensis., Nat. Biotechnol., November;* 20(11): 1118-23.
Kashefi, K., and Lovley, D. R. (2000): Reduction of Fe(III), Mn(IV), and toxic metals at 100 degree C. by *Pyrobaculum islandicum. Appl. Environ. Microbiol.* 66, 1050-1056.
Kuai, L., Nair, A. A., and Polz, M. F. (2001): A rapid and simple method for the MPN estimation of arsenic-reducing bacteria. *Appl. Environ. Microbiol.* July; 67(7):3168-73.
Lovley, D. R., Phillips, E. J. P., Gorby, Y. A., and Landa, E. R. (1991): Microbial reduction of uranium. *Nature* 350, 413-416.
Lovley, D. R., Widman, P. K., Woodward, J. C., and Phillips, E. J. P. (1993a): Reduction of uranium by cytochrome c3 of *Desulfovibrio vulgaris. Appl. Environ. Microbiol.* 59, 3572-3576.
Lovley, D. R., et al. (1993b): *Geobacter metallireducens* gen. nov. sp. nov., a microorganism capable of coupling the complete oxidation of organic compounds to the reduction of iron and other metals. *Arch. Microbiol.* 159:336-344.
Lovley, D. R. (1995): Microbial reduction of iron, manganese, and other metals. *Advances in Agronomy* 54, 175-231.
Mellor, R. B., et al. (1992): Reduction of nitrate and nitrite in water by immobilized enzymes. *Nature.* 355:717-719.
Niki, K., et al. (1977): Electrode reaction of cytochrome c3 of *Desulfovibrio vulgaris*, Miyazaki. *J. Electrochem. Soc.* 124:1889-1892.
Payne, R. B., et al. (2002): Uranium Reduction by *Desulfovibrio desulfuricans* Strain G20 and a Cytochrome c3 Mutant. *Appl. Env. Microbiol.* 68(6), 3129-3132.
Postgate, J. R., 1984. *The sulphate-reducing bacteria.* Cambridge University Press, Cambridge.
Roden, E. E., and Lovley, D. R. (1993): Dissimilatory Fe(III) reduction by the marine microorganism *Desulfuromonas acetoxidans. Appl. Environ. Microbiol.* 59, 734-742.

Suzuki Y, Kelly S D, Kemner K M, Banfield J F. (2002): Nanometer-size products of uranium bioreduction. *Nature*, September 12; 419(6903): 134

Taylor, R. N., Warneke, T., Milton, J. A., Croudace, I. W., Warwick, P. E., and Nesbitt, R. W. (2002): Plutonium isotope ratio analysis at femtogram levels by multicollector ICP-MS. *J. Anal. Atom. Spectr.* 16, 279-284.

Tebo, B. M., and Obraztsova, A. Y. (1998): Sulfate-reducing bacterium grows with Cr(VI), U(VI), Mn(IV), and Fe(III) as electron acceptors. *FEMS Microbiol. Let.* 162, 193-198.

Wade R and DiChristina T J (2000): Isolation of U(VI) reduction-deficient mutants of *Shewanella putrefaciens*. *FEMS Microbiol Lett.* March 15; 184(2):143-8

Zehnder, A. J. B. (ed.), *Biology of anaerobic microorganisms*. Wiley-Interscience, John Wiley & Sons, New York, N.Y., 1988.

We claim:

1. A method for enriching an isotopes of an actinide element comprising steps of:
   (a) providing a composition comprising a first isotope and a second isotope of the actinide element; and
   (b) contacting the composition with microorganisms that have reducing activity of the actinide element, wherein the microorganisms preferentially reduce the second isotope of the actinide element and thereby allowing formation of a second composition comprising reduced actinide element containing a higher proportion of the second isotope relative to the first isotope than was present in the original composition, thereby enriching the second isotope of the actinide element.

2. The method of claim 1, wherein the composition is provided in a culture medium.

3. The method of claim 1, wherein the second composition is insoluble.

4. The method of claim 3, wherein the method further comprises a step of collecting the second composition.

5. The method of claim 3, wherein the method further comprises a step of collecting the second composition and the microorganisms.

6. The method of claim 5, wherein the method further comprises a step of removing from the microorganisms the adsorbed composition containing unreduced actinide element.

7. The method of claim 1, wherein step (b) is performed for a time period between 0.05 and 100 hours.

8. The method of claim 7, wherein step (b) is performed for a time period between 0.1 and 50 hours.

9. The method of claim 7, wherein step (b) is performed for a time period between 0.1 and 20 hours.

10. The method of claim 7, wherein step (b) is performed for a time period between 0.1 and 10 hours.

11. The method of claim 7, wherein step (b) is performed for a time period between 0.1 and 5 hours.

12. The method of claim 1, wherein the method further comprises a step of:
   determining the isotope content of the second composition.

13. The method of claim 1, wherein the method further comprises steps of:
   (c) re-oxidizing the reduced actinide element present in the second composition; and
   (d) repeating steps (a) and (b) using the re-oxidized actinide element as a starting material, thereby further enriching the second isotope of the actinide element.

14. The method of claim 1, wherein the steps are performed in batch mode.

15. The method of claim 1, wherein the steps are performed in continuous mode.

16. The method of claim 1, wherein the microorganisms are separated by a semi-permeable membrane, wherein the semi-permeable membrane allows diffusion of the composition comprising the first and second isotope of the actinide element but does not permit passage of the microorganisms.

17. The method of claim 16, wherein step (b) comprises allowing the composition to flow continuously past the semi-permeable membrane, thereby contacting the microorganisms.

18. The method of claim 16, wherein the microorganisms are present in a medium and wherein the composition and the medium flow in opposite directions.

19. The method of claim 1, further comprising a step of:
   immobilizing the microorganisms prior to performing step (b).

20. The method of claim 19, wherein the step of immobilizing the microorganisms comprises:
   fixing the microorganisms to a solid support.

21. The method of claim 19, wherein the microorganisms are contained within a semi-permeable membrane or membranes.

22. The method of claim 19, wherein step (b) comprises allowing the composition to traverse the immobilized microorganisms.

23. The method of claim 1, wherein the actinide element is uranium.

24. The method of claim 23, wherein the second composition comprises uraninite.

25. The method of claim 23, wherein the microorganisms reduce uranium from the U(VI) state to the U(IV) state.

26. The method of claim 23, wherein the first isotope is heavier than the second isotope.

27. The method of claim 23, wherein the first uranium isotope is U-238.

28. The method of claim 23, wherein the second uranium isotope is U-235.

29. The method of claim 23, wherein the first uranium isotope is U-238 and the second uranium isotope is U-235.

30. The method of claim 1, wherein the method achieves a separation factor of at least 1.02.

31. The method of claim 1, wherein the method achieves a separation factor of at least 1.06.

32. The method of claim 1, wherein the method achieves a separation factor of at least 1.10.

33. The method of claim 1, wherein the actinide element is plutonium.

34. The method of claim 1, wherein the actinide element is neptunium.

35. The method of claim 1, wherein the composition comprises an electron donor.

36. The method of claim 1, wherein the composition comprises counter ions, wherein the counter ions are not electron accepting species that competes with the actinide element for reduction by the microorganisms.

37. The method of claim 36, wherein the counter ion can serve as a substrate for metabolism by the microorganisms under anaerobic conditions.

38. The method of claim 36, wherein the counter ions are selected from the group consisting of: lactate, acetate, and chloride.

39. The method of claim 1, wherein the microorganisms are metal or sulfate reducing bacteria.

40. The method of claim 1, wherein the microorganisms are facultative aerobes.

41. The method of claim 1, wherein the microorganisms are anaerobes.

42. The method of claim 1, wherein the microorganisms are members of a bacterial genus selected from the group consisting of: *Clostridium, Shewanella, Geobacter, Pyrobaculum, Desulfotomaculum*, and *Desulfovibrio*.

43. The method of claim 42, wherein the microorganisms are members of bacterial genus *Shewanella*.

44. The method of claim 42, wherein the microorganisms are members of bacterial strain *Shewanella oneidensis*.

45. The method of claim 42, wherein the microorganisms are selected from the group consisting of *Clostridium* sp., *Deinococcus radiodurans* R1, *Geobacter chapelleii*, *Geobacter hydrogenophilus* H2, *Geobacter hydrogenophilus* H2, *Geobacter* H4, *Geobacter* TACP-2, *Geobacter* TACP-3, *Pyrobaculum islandicum*, *Shewanella alga*, *Shewanella saccharophila*, *Desulfotomaculum reducens* MI-1, *Desulfovibrio desulfuricans*, and *Desulfovibrio vulgaris*.

46. The method of claim 1, wherein the microorganisms are present at a concentration of between approximately $10^7$ and $10^9$ per milliliter.

47. The method of claim 1, wherein the microorganisms overexpress a gene encoding a protein that reduces the actinide element.

48. The method of claim 47, wherein the gene encodes a cytochrome c protein.

49. The method of claim 48, wherein the cytochrome c is a cytochrome c3.

50. The method of claim 1, wherein the microorganisms overexpress a gene encoding a protein involved in a pathway leading to reduction of the actinide element.

51. The method of claim 1, wherein the microorganisms express an altered cytochrome c protein, which altered cytochrome c protein displays an increased ability to reduce the actinide element relative to a wild type version of the protein.

52. The method of claim 1, wherein step (b) takes place in a medium substantially free of counter ions capable of forming insoluble salts with unreduced actinide element.

53. The method of claim 52, wherein the medium is substantially free of phosphate.

54. The method of claim 1, wherein the exposing step (b) is performed in the presence of an organic polymer.

55. The method of claim 1, wherein the method further comprising the a step of:
    culturing the microorganisms under aerobic conditions prior to step (b) and performing step (b) under anaerobic conditions.

56. The method of claim 1, wherein the microorganisms are thermophilic bacteria, and wherein step (b) is performed at a temperature above 50° C.

57. The method of claim 1, wherein the second composition is soluble.

58. The method of claim 57, wherein the method further comprises a step of:
    extracting the second composition comprising the reduced actinide element into separate aqueous phase.

59. The method of claim 58, wherein the method further comprises a step of:
    forming an extractable organic complex comprising reduced actinide element using an organic ligand.

60. The method of claim 59, wherein the organic ligand comprises thenoyltrifluoroacetone.

61. A method for enriching an isotope of an actinide element comprising steps of:
    (a) providing a composition comprising a first isotope and a second isotope of the actinide element; and
    (b) incubating the composition with an actinide reducing enzyme obtained from microorganism that has reducing activity of the actinide element, thereby forming a second composition comprising the reduced actinide element containing a higher proportion of the second isotope relative to the first isotope than was present in the original composition, thereby enriching the second isotope of the actinide element.

62. The method of claim 61, wherein the second composition is insoluble.

63. The method of claim 62, wherein the method further comprises a step of collecting the second composition using an organic polymer.

64. The method of claim 61, wherein the steps are performed in batch mode.

65. The method of claim 61, wherein the steps are performed in continuous mode.

66. The method of claim 61, wherein the enzyme is at least partially purified.

67. The method of claim 61, wherein an electron donor is present during the incubating step.

68. The method of claim 61, wherein the actinide reducing enzyme is a cytochrome c enzyme.

69. The method of claim 68, wherein the cytochrome c is a cytochrome c3.

70. The method of claim 68, wherein the cytochrome c is at least partially purified.

71. The method of claim 61, wherein a hydrogenase obtained from the microorganism is present during the incubating step.

72. The method of claim 71, wherein the hydrogenase is at least partially purified.

73. The method of claim 71, wherein an electron donor in addition to hydrogenase is present during the incubating step.

74. The method of claim 61, wherein a material providing a nucleation site to precipitate the second composition is provided during the incubating step.

75. The method of claim 61, wherein the incubating step is performed in a fixed enzyme reactor.

76. The method of claim 61, wherein the actinide element is uranium.

77. The method of claim 76, wherein the second composition comprises uraninite.

78. The method of claim 76, wherein the enzyme reduces uranium from the U(VI) state to the U(IV) state.

79. The method of claim 76, wherein the first isotope is heavier than the second isotope.

80. The method of claim 76, wherein the first uranium isotope is U-238.

81. The method of claim 76, wherein the second uranium isotope is U-235.

82. The method of claim 76, wherein the first uranium isotope is U-238 and the second uranium isotope is U-235.

83. The method of claim 1, wherein the actinide element is uranium and the microorganisms are members of bacterial genus *Shewanella*.

84. The method of claim 83, wherein the actinide element is uranium and the microorganisms are members of bacterial strain *Shewanella oneidensis*.

85. The method of claim 83, wherein the first uranium isotope is U-238 and the second uranium isotope is U-235.

\* \* \* \* \*

UNITED STATES PATENT AND TRADEMARK OFFICE
CERTIFICATE OF CORRECTION

| | | |
|---|---|---|
| PATENT NO. | : 7,452,703 B1 | Page 1 of 1 |
| APPLICATION NO. | : 10/802637 | |
| DATED | : November 18, 2008 | |
| INVENTOR(S) | : Kenneth R. Czerwinski and Martin F. Polz | |

It is certified that error appears in the above-identified patent and that said Letters Patent is hereby corrected as shown below:

In the claims:

In column 27, line 18, please delete the word "isotopes" and replace it with the word --isotope--

In column 28, line 54, please delete the word "competes" and replace it with the word --compete--

In column 30, line 2, please insert the letter --a-- after the word "from" but before the word "microorganism"

Signed and Sealed this

Nineteenth Day of May, 2009

JOHN DOLL
*Acting Director of the United States Patent and Trademark Office*